(12) United States Patent
Li et al.

(10) Patent No.: US 11,606,787 B2
(45) Date of Patent: Mar. 14, 2023

(54) COMMUNICATIONS METHOD, APPARATUS, AND SYSTEM TO SUPPORT SLOT AGGREGATION

(71) Applicant: HUAWEI TECHNOLOGIES CO., LTD., Guangdong (CN)

(72) Inventors: Hua Li, Shanghai (CN); Hao Tang, Shanghai (CN); Yongzhao Cao, Shanghai (CN); Xinxian Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 235 days.

(21) Appl. No.: 16/990,784

(22) Filed: Aug. 11, 2020

(65) Prior Publication Data
US 2020/0374875 A1    Nov. 26, 2020

Related U.S. Application Data

(63) Continuation of application No. PCT/CN2019/073778, filed on Jan. 29, 2019.

(30) Foreign Application Priority Data

Feb. 13, 2018   (CN) .......................... 201810151034.9
Mar. 2, 2018    (CN) .......................... 201810173318.8

(51) Int. Cl.
*H04W 72/04*        (2009.01)
*H04L 5/00*         (2006.01)
*H04W 72/0446*      (2023.01)

(52) U.S. Cl.
CPC ....... *H04W 72/0446* (2013.01); *H04L 5/0078* (2013.01)

(58) Field of Classification Search
CPC .................. H04W 72/0446; H04L 5/0078
See application file for complete search history.

(56) References Cited

U.S. PATENT DOCUMENTS

2013/0301492 A1   11/2013   Ji et al.
2014/0108437 A1   4/2014    Brown et al.
(Continued)

FOREIGN PATENT DOCUMENTS

| CN | 101043715 A | 9/2007 |
|----|-------------|--------|
| CN | 106385709 A | 2/2017 |
| CN | 107409021 A | 11/2017 |

OTHER PUBLICATIONS

Apple Inc.,"Group-common PDCCH for NR", 3GPP TSG-RAN WG1 #89 R1-1708280, Hangzhou, China, May 15-19, 2017, total 4 pages.
(Continued)

*Primary Examiner* — Benjamin H Elliott, IV
*Assistant Examiner* — Nevena Zecevic Sandhu
(74) *Attorney, Agent, or Firm* — Womble Bond Dickinson (US) LLP

(57) ABSTRACT

A communications method includes: obtaining first indication information and format information; and determining, based on a transmission direction that is of a sub-time unit in a time unit and that is indicated by the first indication information and a transmission direction that is of the sub-time unit and that is indicated by the format information, whether the time unit is an aggregation time unit. It is determined, based on the transmission direction that is of the sub-time unit in the time unit and that is configured in the first indication information and the transmission direction that is of the sub-time unit and that is configured in the format information, whether the time unit is an aggregation time unit.

17 Claims, 7 Drawing Sheets

(56) References Cited

U.S. PATENT DOCUMENTS

| | | | |
|---|---|---|---|
| 2018/0279304 A1* | 9/2018 | Lee | H04W 72/042 |
| 2018/0309513 A1* | 10/2018 | Kim | H04B 7/2643 |
| 2018/0367289 A1* | 12/2018 | Kim | H04L 5/0096 |
| 2019/0149365 A1* | 5/2019 | Chatterjee | H04L 5/0048 370/329 |
| 2020/0120642 A1* | 4/2020 | Hwang | H04L 5/0048 |
| 2020/0177341 A1* | 6/2020 | Li | H04L 5/0053 |
| 2021/0068115 A1* | 3/2021 | Gotoh | H04W 72/0493 |

OTHER PUBLICATIONS

Intel Corporation, "On slot aggregation for data transmission", 3GPP TSG HAN won Meeting #88bis, R1-1704767, Spokane, USA, Apr. 3-7, 2017, total 4 pages.

Qualcomm Incorporated, "Offline discussion on GC-PDCCH carrying SFI", 3GPP TSG RAN WG1 #91 R1-1721702, (Dec. 4, 2017), total 17 pages.

3GPP TS 38.214 V15.0.0: 3rd Generation Partnership Project; Technical Specification Group Radio Access Network; NR; Physical layer procedures for data (Release 15) Dec. 2017 total 71 pages.

\* cited by examiner

COMMUNICATIONS METHOD, APPARATUS, AND SYSTEM TO SUPPORT SLOT AGGREGATION

CROSS-REFERENCE TO RELATED APPLICATIONS

This application is a continuation of International Application No. PCT/CN2019/073778, filed on Jan. 29, 2019, which claims priority to Chinese Patent Application No. 201810151034.9, filed on Feb. 13, 2018 and claims priority to Chinese Patent Application No. 201810173318.8, filed on Mar. 2, 2018. The disclosures of the aforementioned applications are hereby incorporated by reference in their entireties.

TECHNICAL FIELD

This application relates to the communications field, and in particular, to a communications method, apparatus, and system.

BACKGROUND

In a fifth-generation (5G for short) new radio (NR for short) system, communication transmission supports a flexible slot structure.

Data transmission in the NR system supports a slot aggregation technology. In the slot aggregation technology, data is transmitted in one or more slots. Data transmission performed by using the slot aggregation technology occupies more resources, thereby enhancing data transmission coverage and improving data transmission reliability.

How to support the slot aggregation technology in the flexible slot structure is an issue that needs to be researched.

SUMMARY

Embodiments of this application provide a communications method, apparatus, and system, to support a slot aggregation technology in a flexible slot structure.

According to a first aspect, this application provides a communications method, applied to a terminal device, including:

obtaining first indication information and format information; and determining, based on a transmission direction that is of a sub-time unit in a time unit and that is indicated by the first indication information and a transmission direction that is of the sub-time unit and that is indicated by the format information, whether the time unit is an aggregation time unit.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a transmission direction that is of at least one sub-time unit in the time unit and that is indicated by the first indication information is the same as a transmission direction that is of the at least one sub-time unit and that is indicated by the format information, determining that the time unit is an aggregation time unit.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a proportion of a first sub-time unit to at least one sub-time unit in the time unit reaches M, determining that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a quantity of second sub-time units in the time unit is less than P, determining that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a proportion of a third sub-time unit to at least one sub-time unit in the time unit is less than Q, determining that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the communications method further includes:

obtaining second indication information, where the second indication information indicates an aggregation quantity; and determining a quantity of aggregation time units based on the aggregation quantity.

According to a second aspect, this application further provides a communications method, applied to a network device, where the method includes:

determining first indication information and format information; and determining, based on a transmission direction that is of a sub-time unit in a time unit and that is indicated by the first indication information and a transmission direction that is of the sub-time unit and that is indicated by the format information, whether the time unit is an aggregation time unit.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a transmission direction that is of at least one sub-time unit in the time unit and that is indicated by the first indication information is the same as a transmission direction that is of the at least one sub-time unit and that is indicated by the format information, determining that the time unit is an aggregation time unit.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a proportion of a first sub-time unit to at least one sub-time unit in the time unit reaches M, determining that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a quantity of second sub-time units in the time unit is less than P, determining that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a proportion of a third sub-time unit to at least one sub-time unit in the time unit is less than Q, determining that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the communications method further includes:

determining second indication information, and sending the second indication information to the terminal device, where the second indication information indicates an aggregation quantity; and determining a quantity of aggregation time units based on the aggregation quantity.

In one embodiment, the communications method further includes:

sending at least one of the first indication information, the format information, and the second indication information to the terminal device.

According to a third aspect, this application further provides a communications apparatus, configured to perform the communications method in the first aspect, where the communications apparatus includes:

an obtaining module, configured to obtain first indication information and format information; and an aggregation time unit determining module, configured to determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the aggregation time unit determining module is configured to:

when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the aggregation time unit determining module is configured to:

when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the aggregation time unit determining module is configured to:

when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the aggregation time unit determining module is configured to:

when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the obtaining module is further configured to obtain second indication information, where the second indication information indicates an aggregation quantity; and the aggregation time unit determining module is further configured to determine a quantity of aggregation time units based on the aggregation quantity.

According to a fourth aspect, this application further provides a communications apparatus, configured to perform the communications method in the second aspect, and including:

an obtaining module, configured to determine first indication information and format information; and an aggregation time unit determining module, configured to determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the aggregation time unit determining module is configured to:

when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the aggregation time unit determining module is configured to:

when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the aggregation time unit determining module is configured to:

when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the aggregation time unit determining module is configured to:

when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the obtaining module is further configured to determine second indication information, where the second indication information indicates an aggregation quantity; and the aggregation time unit determining module is further configured to determine a quantity of aggregation time units based on the aggregation quantity.

In one embodiment, the communications apparatus further includes:

a sending module, configured to send at least one of the first indication information, the format information, and the second indication information to a terminal device.

According to a fifth aspect, this application further provides a terminal device, configured to perform the communications method in the first aspect, and including:

a receiver, configured to obtain first indication information and format information; and a processor, configured to determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the processor is configured to:

when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the processor is configured to:

when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the processor is configured to:

when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the processor is configured to:

when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the receiver is further configured to obtain second indication information, where the second indication information indicates an aggregation quantity; and the processor is further configured to determine a quantity of aggregation time units based on the aggregation quantity.

According to a sixth aspect, this application further provides a network device, configured to perform the communications method in the second aspect, and including:

a processor, configured to: determine first indication information and format information; and determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the processor is configured to:

when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the processor is configured to:

when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the processor is configured to:

when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the processor is configured to:

when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the processor is further configured to determine second indication information, where the second indication information indicates an aggregation quantity; and the processor is further configured to determine a quantity of aggregation time units based on the aggregation quantity.

In one embodiment, the network device further includes: a transmitter, configured to send at least one of the first indication information, the format information, and the second indication information to a terminal device.

According to a seventh aspect, this application further provides a communications system, including the terminal device in the fifth aspect and the embodiments of the fifth aspect and the network device in the sixth aspect and the embodiments of the sixth aspect.

According to an eighth aspect, this application further provides a terminal device, including a memory, a processor, and a computer program, where the computer program is stored in the memory, and the processor runs the computer program to perform the communications method in the first aspect and the embodiments of the first aspect.

According to a ninth aspect, this application further provides a network device, including a memory, a processor, and a computer program, where the computer program is stored in the memory, and the processor runs the computer program to perform the communications method in the second aspect and the embodiments of the second aspect.

According to a tenth aspect, this application further provides a computer storage medium, where the storage medium includes a computer program, and the computer program is used to implement the communications method in the first aspect and the embodiments of the first aspect.

According to an eleventh aspect, this application further provides a computer storage medium, where the storage medium includes a computer program, and the computer program is used to implement the communications method in the second aspect and the embodiments of the second aspect.

According to a twelfth aspect, this application further provides a computer program product, where the computer program product includes computer program code, and when the computer program code is run on a computer, the computer is enabled to perform the communications method in the first aspect and the embodiments of the first aspect.

According to a thirteenth aspect, this application further provides a computer program product, where the computer program product includes computer program code, and when the computer program code is run on a computer, the computer is enabled to perform the communications method in the second aspect and the embodiments of the second aspect.

According to a fourteenth aspect, this application further provides a chip, including a memory and a processor, where the memory is configured to store a computer program, and the processor is configured to invoke the computer program from the memory and run the computer program, so that a communications device in which the chip is installed is enabled to perform the communications method in the first aspect and the embodiments of the first aspect.

According to a fifteenth aspect, this application further provides a chip, including a memory and a processor, where the memory is configured to store a computer program, and the processor is configured to invoke the computer program from the memory and run the computer program, so that a communications device in which the chip is installed is enabled to perform the communications method in the second aspect and the embodiments of the second aspect.

According to a sixteenth aspect, an embodiment of this application provides an apparatus, including at least one processor and at least one memory, where the processor is configured to perform the method in either of the first aspect and the second aspect, and the at least one memory is coupled to the at least one processor.

According to a seventeenth aspect, an embodiment of this application provides an apparatus, including at least one processor and at least one memory, where the at least one memory is coupled to the at least one processor, the at least one memory is configured to store computer program code or a computer instruction, and when the one or more processors execute the computer program code or the computer instruction, the apparatus performs the method in either of the first aspect and the second aspect.

According to an eighteenth aspect, an embodiment of this application provides an apparatus, including at least one processor, where the processor is configured to perform the method in either of the first aspect and the second aspect.

According to a nineteenth aspect, an embodiment of this application provides an apparatus, including at least one communications interface, configured to perform sending and receiving operations in the method in either of the first aspect and the second aspect. Further, the apparatus may further include at least one processor, configured to perform processing operations in the method in either of the first aspect and the second aspect, where the at least one processor is coupled to the at least one communications interface.

In one embodiment, the foregoing processing operations include determining whether the time unit is an aggregation time unit, and the like. In one embodiment, the foregoing sending and receiving operations include implementing information exchange inside the apparatus, or implementing transmission between a network device and a communications device.

According to a twentieth aspect, an embodiment of this application provides a computer storage medium, including a computer instruction, where when the computer instruction is run on an apparatus, the apparatus is enabled to perform the method in either of the first aspect and the second aspect.

According to a twenty-first aspect, an embodiment of this application provides a computer program product, where when the computer program product is run on a computer, the computer is enabled to perform the method in either of the first aspect and the second aspect.

According to a twenty-second aspect, an embodiment of this application provides a chip, where the chip exists in a form of an apparatus, and the chip may be any apparatus in the sixteenth aspect to the twenty-first aspect.

In this application, the embodiments provided in the foregoing aspects may be further combined to provide more embodiments.

DESCRIPTION OF EMBODIMENTS

Figure 1:
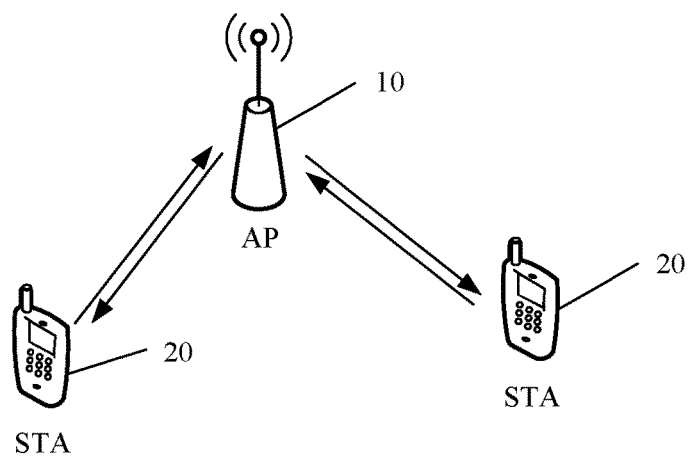
FIG. 1 shows a system architecture to which an embodiment of this application is applicable.

FIG. 1 is a schematic diagram of Embodiment 1 of a network architecture to which an embodiment of this application is applicable. As shown in FIG. 1, the network architecture provided in this embodiment includes a network device 10 and at least one terminal device 20.

The network device 10 is a device that connects the terminal device 20 to a wireless network, and may be a base transceiver station (BTS for short) in a global system for mobile communications (GSM for short) or code division multiple access (CDMA for short), may be a NodeB (NB for short) in wideband code division multiple access (WCDMA for short), or may be an evolved NodeB (eNB or eNodeB for short) in long term evolution (LTE for short), or a relay station or an access point, or a base station in a future fifth-generation mobile communications (5G) network, or a relay station, an access point, a vehicle-mounted device, a wearable device, or the like that operates in a high frequency band. This is not limited in this application. FIG. 1 is a possible schematic diagram, and is drawn by using an example in which the network device 10 is a base station.

The terminal device 20 may be a wireless terminal or a wired terminal. The wireless terminal may be a device that provides a user with voice and/or other service data connectivity, a handheld device with a radio connection function, or another processing device connected to a radio modem. The wireless terminal may communicate with one or more core networks through a radio access network (RAN for short). The wireless terminal may be a mobile terminal, such as a mobile phone (also referred to as a "cellular" phone) or a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS for short) phone, a cordless telephone set, a session initiation protocol (SIP for short) phone, a wireless local loop (WLL for short) station, or a personal digital assistant (PDA for short). The wireless terminal may also be referred to as a system, a subscriber unit, a subscriber station, a mobile station, a mobile console, a remote station, a remote terminal, an access terminal, a user terminal, or a user agent. This is not limited in this application. FIG. 1 is a possible schematic diagram, and is drawn by using an example in which the terminal device 20 is a mobile phone.

In a conventional LTE communications system, data transmission between the network device 10 and the terminal device 20 is performed in one radio frame serving as a time unit. One radio frame includes 10 1-ms subframes. Each subframe includes two slots, and a quantity of symbols included in each slot is related to a length of a cyclic prefix (CP) in the subframe.

In one embodiment, in an orthogonal frequency division multiplexing (OFDM) system, to eliminate inter-symbol interference to greatest extent, a guard interval needs to be inserted between every two OFDM symbols. A length of the guard interval usually needs to be greater than a maximum delay spread of a radio channel. In this way, a multipath component of one symbol does not interfere with a next symbol. A signal within the guard interval is referred to as a cyclic prefix CP. CPs may be classified into a normal CP (NCP) and an extended CP (ECP). The ECP is usually applied to an environment in which a channel with a large delay spread exists.

If the CP is a normal CP, each slot includes seven symbols, and each subframe includes 14 symbols. For example, each subframe includes symbols whose sequence numbers are respectively #0, #1, #2,#3, #4,#5, #6,#7, #8,#9, #10, #11, #12, and #13. If the CP is an extended CP, each slot includes six symbols, and each subframe includes 12 symbols. For example, each subframe includes symbols whose sequence numbers are respectively #0, #1, #2,#3, #4,#5, #6,#7, #8,#9, #10, and #11.

In the LTE communications system, seven fixed frame configuration structures are specified for each subframe that is used as an uplink subframe or a downlink subframe in a radio frame, as shown in Table 1. The uplink subframe is used for data transmission from the terminal device 20 to the network device 10, that is, uplink data transmission. The downlink subframe is used for data transmission from the network device 10 to the terminal device 20, that is, downlink data transmission.

TABLE 1

| Frame configuration structure | Uplink-downlink subframe switching period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a downlink subframe, U represents an uplink subframe, and S represents a special subframe. The special subframe S is used for downlink-to-uplink switching, and includes some downlink symbols, symbols for uplink-downlink switching, and some uplink symbols. When the terminal device 20 and the network device 10 communicate, only any one of the seven frame structures in Table 1 can be used. This fixed frame configuration structure limits flexibility of communication between the terminal device 20 and the network device 10 to some extent, and is not conducive to transmission of a low-latency service.

To improve communication flexibility, a 5G NR communications system may support a plurality of numerologies. The numerology may be defined by using one or more of the following parameter information: a subcarrier spacing, a cyclic prefix CP, a time unit, a bandwidth, and the like. The time unit is used to indicate a time length or a time unit in time domain, and may be, for example, a sampling point, a symbol, a mini-slot, a slot, a plurality of slots, a subframe, a radio frame, or a frame structure. Information about the time unit may include a type, a length, a structure, or the like of the time unit.

In the 5G NR communications system, one radio frame is 10 ms, and includes 10 subframes. One subframe includes at least one slot, and one slot always includes 14 symbols. A quantity of slots in one subframe is related to a corresponding subcarrier spacing, as shown in Table 2.

TABLE 2

| μ | Quantity of symbols in one slot | Quantity of slots in one frame | Quantity of slots in one subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 3

| μ | Subcarrier spacing (kHz) | Cyclic prefix CP |
|---|---|---|
| 0 | 15 | Normal |
| 1 | 30 | Normal |
| 2 | 60 | Normal, extended |
| 3 | 120 | Normal |
| 4 | 240 | Normal |

In Table 2, an example in which the CP is a normal CP is used to describe quantities of slots that correspond to different subcarrier spacings. In Table 2, μ represents indexes of different subcarrier spacings, and a correspondence between a subcarrier spacing and μ is shown in Table 3. For example, when the subcarrier spacing is 15 kHz, a corresponding value of μ is 0. In this case, the CP is "normal", a quantity of slots in one subframe is 1, and a quantity of slots in one frame is 10. When the subcarrier spacing is 30 kHz, a corresponding value of μ is 1. In this case, the CP is "normal", a quantity of slots in one subframe is 2, and a quantity of slots in one frame is 20. By modifying the numerologies in the 5G NR communications system, flexibility of data transmission in the 5G communications system can be improved.

In the 5G NR communications system, communication transmission further supports a flexible slot structure (slot format). To be specific, all symbols in one slot may be used for uplink data transmission, or all symbols in one slot may be used for downlink data transmission, or some symbols in one slot may be used for uplink data transmission and some symbols in the slot may be used for downlink data transmission. The slot structure may be configured based on slot format related information (SFI). The SFI indicates that in a corresponding slot, each symbol is an uplink symbol, a downlink symbol, or an unknown symbol. Details may be shown in Table 4.

TABLE 4

| Slot format | Quantity of symbols in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | X | X | U |
| 47 | D | D | X | U | U | U | U | D | D | X | U | U | U | U |
| 48 | D | X | U | U | U | U | U | D | X | U | U | U | U | U |
| 49 | D | D | D | D | X | U | D | D | D | D | X | X | X | U |
| 50 | D | D | X | U | U | U | U | D | D | X | U | U | U | U |
| 51 | D | X | U | U | U | U | U | D | X | U | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | D | D | D | D | D | D | D | D |
| 55 | D | D | X | X | U | U | U | D | D | D | D | D | D | D |
| 56-255 | Reserved | | | | | | | | | | | | | |

Herein, D represents a downlink symbol, U represents an uplink symbol, and X represents an unknown symbol. The unknown symbol may be indicated by subsequent information of the network device 10 to perform uplink transmission or downlink transmission, or may be configured by the terminal device 20 to perform uplink transmission or downlink transmission, or may be used as a time interval for uplink-downlink switching. Compared with the LTE communications system, in the 5G communications system, each subframe may include a downlink transmission opportunity and an uplink transmission opportunity. This is more conducive to transmission of a low-latency service.

In a slot aggregation technology, uplink data transmission or downlink data transmission is performed in one or more slots. Data transmission performed by using the slot aggregation technology occupies more resources, thereby enhancing data transmission coverage and improving data transmission reliability.

In the LTE communications system, when data transmission is performed based on the slot aggregation technology, an optional frame configuration structure needs to be determined based on a data transmission direction, a quantity of to-be-aggregated slots indicated by an aggregation factor, and the frame configuration structures in Table 1, and consequently frame structure flexibility is relatively poor.

In the 5G NR system, the network device 10 may perform slot aggregation scheduling by using dynamic downlink control information (DCI), and the DCI indicates a data transmission direction and a symbol that is in a slot and that is used for uplink/downlink transmission. The DCI may be sent by the network device 10 to the terminal device 20 through a physical downlink control channel (PDCCH).

In one embodiment, the network device 10 may send an uplink time-domain resource allocation table and a downlink time-domain resource allocation table to the terminal device 20 by using higher layer signaling such as radio resource control (RRC). The uplink/downlink time-domain resource allocation table includes a maximum of 16 rows.

Each row in a downlink time-domain resource allocation table shown in Table 5 includes at least one of the following: a time relationship between downlink scheduling and corresponding downlink data transmission (Timing between Downlink assignment and corresponding Downlink data transmission, K0), time-domain resource allocation information, and a scheduling type (or a PDSCH mapping type). For example, Table 5 includes four rows. The time-domain resource allocation information includes a start symbol and a quantity of symbols.

TABLE 5

| Index index number | K0 | Start symbol | Quantity of symbols | Scheduling type (PDSCH mapping type) |
|---|---|---|---|---|
| 0 | 0 | 2 | 10 | A |
| 1 | 1 | 3 | 8 | A |
| 2 | 0 | 4 | 7 | B |
| 3 | 3 | 2 | 10 | A |

Figure 2:
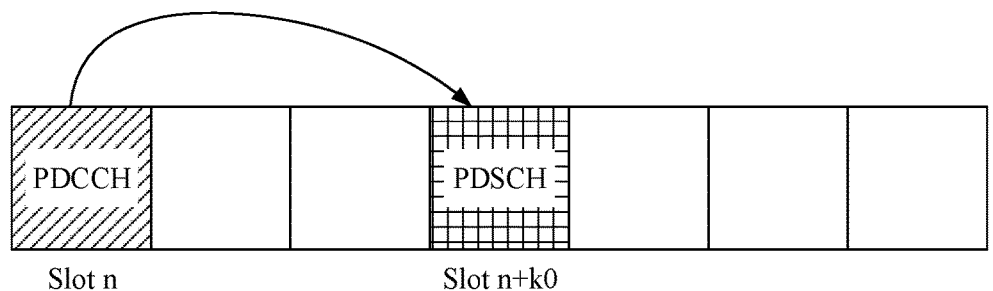
FIG. 2 is a schematic diagram of a time relationship between downlink scheduling and corresponding downlink data transmission according to an embodiment of this application.

In one embodiment, FIG. 2 is a schematic diagram of a time relationship between downlink scheduling and corresponding downlink data transmission according to an embodiment of this application. As shown in FIG. 2, if the network device 10 sends the DCI to the terminal device in a time unit n through the PDCCH, a time unit corresponding to data that is scheduled by using the DCI and that is transmitted on a physical downlink shared channel (PDSCH) is n+K0. A value of K0 in FIG. 2 is, for example, 3. For ease of description, time units related to K0 are collectively referred to as a slot below. However, a time unit described in the embodiments of this application is not limited to a slot.

In one embodiment, the time-domain resource allocation information may indicate a time-domain resource, for example, indicate a start symbol occupied by scheduled data in one time unit and a quantity of symbols. For example, when the time unit is a slot, the time-domain resource allocation information indicates an index of a start symbol of scheduled data in a scheduled slot and a quantity of symbols of the scheduled data. For example, the time-domain resource allocation information may be encoded as a start and length indicator value (SLIV).

For example, for NCP and PDSCH resource mapping type A, in one slot, an index of a start symbol of the scheduled data may be 0, 1, 2, or 3, and a length of the scheduled data is a maximum of 14 symbols. For NCP and PDSCH resource mapping type B, in one slot, an index of a start symbol of the scheduled data may be any value, and a length of the scheduled data may be 2, 4, or 7 symbols. For NCP and PUSCH resource mapping type A, in one slot, an index of a start symbol of the scheduled data is 0, and a length of the scheduled data is a maximum of 14 symbols. For NCP and PUSCH resource mapping type B, in one slot, an index of a start symbol of the scheduled data is any value, and a length of the scheduled data is a maximum of 14 symbols. For ECP and PDSCH resource mapping type A, in one slot, an index of a start symbol of the scheduled data may be 0, 1, 2, or 3, and a length of the scheduled data is a maximum of 12 symbols. For ECP and PDSCH resource mapping type B, in one slot, an index of a start symbol of the scheduled data may be any value, and a length of the scheduled data may be 2, 4, or 6 symbols. For ECP and PUSCH resource mapping type A, in one slot, an index of a start symbol of the scheduled data is 0, and a length of the scheduled data is a maximum of 12 symbols. For NCP and PUSCH resource mapping type B, in one slot, an index of a start symbol of the scheduled data is any value, and a length of the scheduled data is a maximum of 12 symbols.

For example, the DCI sent by the network device 10 to the terminal device 20 may carry an index number, and the index number indicates a specific row in the downlink time-domain resource allocation table that corresponds to a time-domain resource allocated for data transmission scheduled by using the DCI, so that the terminal device 20 can learn of a value of K0 and a time-domain resource that is allocated by the network device 10 and that is used for data transmission. For example, the network device 10 may further send a value set of K0 to the terminal device 20 by using the RRC, for example, {1, 2, 3, 4}, notify the terminal device 20 of a value of K0 in the set by using the DCI, and no longer place K0 in the time-domain resource allocation table.

Figure 3:
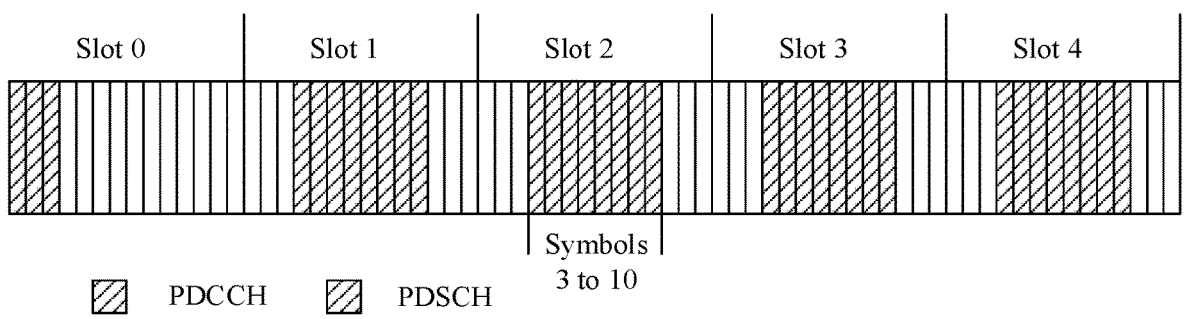
FIG. 3 is a schematic diagram of an aggregation slot according to an embodiment of this application.

For example, the terminal device 20 receives an aggregation factor sent by the network device 10 by using the RRC. The terminal device 20 may determine, based on the aggregation factor, K0 indicated by the DCI, and the SLIV, an aggregation slot that is used for aggregation and that is occupied when data transmission is performed by using the aggregation slot technology. FIG. 3 is a schematic diagram of an aggregation slot according to an embodiment of this application. As shown in FIG. 3, an example in which the aggregation factor is 4, the value of K0 is 1, the start symbol is 3, and the quantity of symbols is 8 is used to describe the aggregation slot in FIG. 3.

Figure 4:
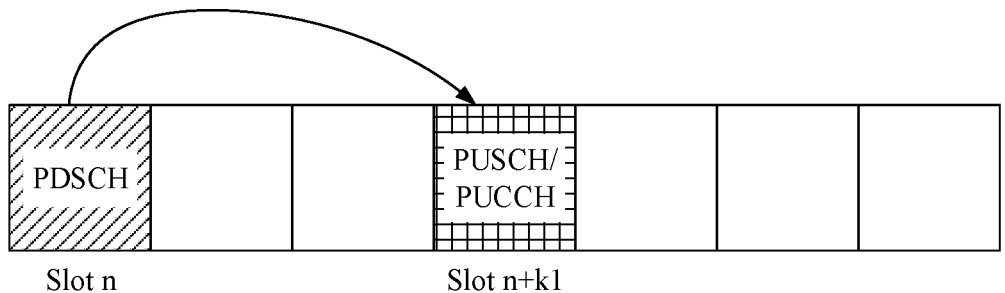
FIG. 4 is a schematic diagram of a time relationship between downlink data transmission and a corresponding HARQ codebook feedback according to an embodiment of this application.

For example, the DCI sent by the network device 10 to the terminal device 20 further carries a time relationship between downlink data transmission and a corresponding hybrid automatic repeat request (HARQ) codebook feedback (Timing between DL data reception and corresponding acknowledgement, K1). FIG. 4 is a schematic diagram of a time relationship between downlink data transmission and a corresponding HARQ codebook feedback according to an embodiment of this application. In one embodiment, if the network device 10 sends downlink data to the terminal device 20 in a time unit n through a PDSCH, the terminal device 20 transmits, to the network device 10 in a time unit n+K1, uplink feedback information corresponding to the downlink data, for example, uplink control information (UCI). A value of K1 in FIG. 4 is, for example, 3. Generally, the terminal device 20 transmits the UCI to the network device 10 through a PUSCH or a PUCCH. The network device 10 may preconfigure a value set of K1, for example, {1, 2, 3, 4}, and send the value set of K1 to the terminal device by using RRC signaling. Then, the network device 10 sends the DCI to the terminal device 20, to notify the terminal device 20 of an allocated value of K1 in the set that is used for data transmission.

In one embodiment, each row in an uplink time-domain resource allocation table includes at least one of the following: a time relationship between uplink scheduling and corresponding uplink data transmission (Timing between UpLink assignment and corresponding UpLink data transmission, K2), and time-domain resource allocation information. Herein, K2 indicates a time interval from a PDCCH to a PUSCH. If the network device 10 sends the DCI to the terminal device in the time unit n through the PDCCH, a time unit corresponding to data that is scheduled by using the DCI and that is transmitted on a physical uplink shared channel (PUSCH) is n+K2. The time-domain resource allocation information is the same as the time-domain resource information in the downlink time-domain resource allocation table. Details are not described in this application again.

Referring to the foregoing analysis, both the slot structure configured by the network device 10 and the slot aggregation scheduling indicated by the network device 10 by using the DCI indicate that symbols in a slot are used for uplink/downlink transmission. Therefore, there may be a case in which the slot structure configured by the network device 10 conflicts with the slot aggregation scheduling indicated by the network device 10 by using the DCI. A solution to the foregoing conflict in the NR system is as follows: The terminal device determines consecutive slots as aggregation slots based on the aggregation factor. However, when consecutive slots are used as aggregation slots, a problem that transmission of a latency-sensitive data is unfavorable exists, and consequently data transmission efficiency is affected.

To resolve the foregoing problem, this application provides a communications method, to improve data transmission efficiency. The following describes in detail the communications method provided in this application by using a detailed embodiment.

Figure 5:
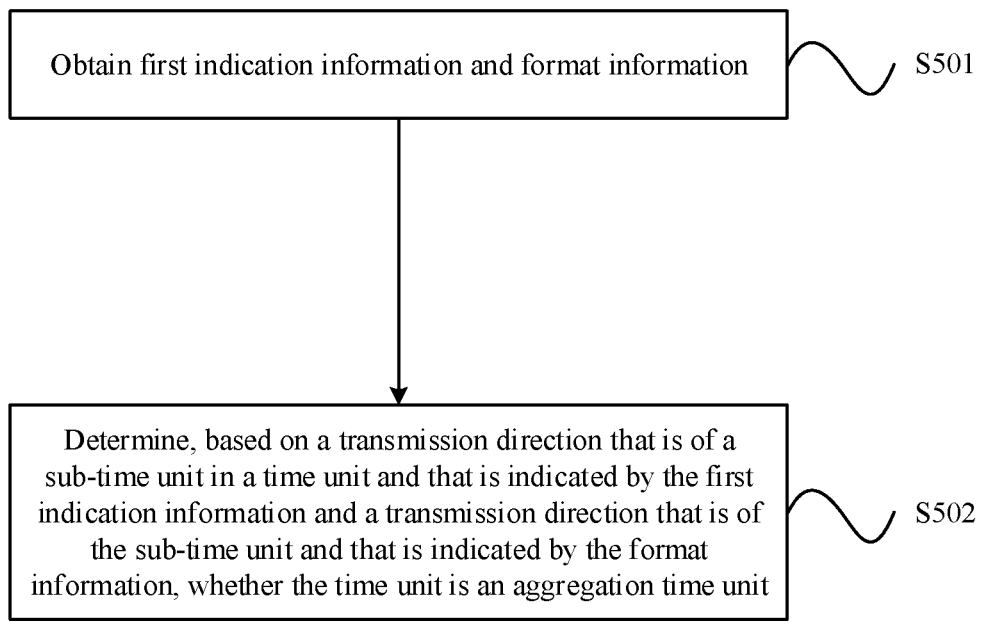
FIG. 5 is a schematic flowchart of a communications method according to Embodiment 1 of this application.

FIG. 5 is a schematic flowchart of a communications method according to Embodiment 1 of this application. The method may be performed by the terminal device 20 in FIG. 1. This embodiment relates to a method for obtaining an aggregation slot in a communication process, that is, determining, based on both SFI and an SLIV that are configured by a network device for a terminal device, whether a slot is an aggregation slot, thereby improving data transmission efficiency. As shown in FIG. 5, the method includes the following operations.

S501. Obtain first indication information and format information.

In one embodiment, the first indication information may be a start and length indicator value (SLIV), and the format information may be slot format related information (SFI).

In one embodiment, the terminal device obtains the SLIV in the following manner:

The terminal device receives downlink control information sent by the network device, and the downlink control information carries an index number. The terminal device obtains, based on the index number, the SLIV from a time-domain resource allocation table corresponding to a transmission direction indicated by a format of the DCI.

For example, when receiving the DCI, the terminal device may determine, based on the format of the DCI, that uplink data transmission or downlink data transmission is performed. When the format of the DCI indicates downlink data transmission, the terminal device determines the SLIV in a downlink time-domain resource allocation table based on the index number in the DCI. When the format of the DCI indicates uplink data transmission, the terminal device determines the SLIV in an uplink time-domain resource allocation table based on the index number in the DCI.

In one embodiment, a process in which the terminal device obtains the SFI is as follows:

The terminal device obtains the SFI sent by the network device by using RRC signaling or downlink control information.

For example, the network device may configure the SFI for the terminal device in a semi-static manner, for example, by using the RRC signaling. The network device further configures a period of the SFI by using the RRC signaling. The period of the SFI may be 0.125 ms, 0.25 ms, 0.5 ms, 1 ms, 2 ms, 5 ms, 10 ms, or the like. For example, the network device may alternatively configure the SFI for the terminal device in a dynamic manner, for example, by using the DCI. For example, the terminal device obtains the SFI by detecting a group common downlink control channel Group Common PDCCH. One group common PDCCH may indicate SFI of one or more slots.

S502. Determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the time unit may be a frame, a subframe, a slot, or the like. In the following embodiments of this application, an example in which the time unit is a slot is used to describe a process of determining whether the time unit is an aggregation time unit.

The transmission direction that is of the sub-time unit in the time unit and that is indicated by the first indication information may be a transmission direction of to-be-transmitted data in the sub-time unit, and the transmission direction may be an uplink direction, a downlink direction, or an unknown direction. In one embodiment, some or all of sub-time units in the time unit may be determined based on the first indication information, and transmission directions of the some or all of the sub-time units are determined based on the format of the DCI corresponding to the first indication information. The transmission directions are the same. For example, for a slot n including 14 symbols, the first indication information indicates that transmission directions of the symbol 3 to the symbol 10 are downlink transmission directions. The format information indicates a transmission direction of each sub-time unit in the time unit, for example, an uplink direction, a downlink direction, or an unknown direction. For example, for the slot n, the format information indicates a transmission direction of each symbol in the slot n. In this embodiment, whether the slot n is an aggregation slot may be determined based on whether the transmission directions of the symbol 3 to the symbol 10 in the first indication information conflict with the transmission directions in the format information.

For example, for any sub-time unit, when the first indication information indicates that a transmission direction of the sub-time unit is an uplink direction, if the format information indicates that a transmission direction of the sub-time unit is an uplink direction or an unknown direction, it is determined that the transmission directions are the same; or if the format information indicates that a transmission direction of the sub-time unit is a downlink direction, it is determined that the transmission directions are different. Likewise, for any sub-time unit, when the first information indicates that a transmission direction of the sub-time unit is a downlink direction, if the format information indicates that a transmission direction of the sub-time unit is a downlink direction or an unknown direction, it is determined that the transmission directions are the same; or if the format information indicates that a transmission direction of the sub-time unit is an uplink direction, it is determined that the transmission directions are different. For any sub-time unit, when the first indication information indicates that a transmission direction of the sub-time unit is an unknown direction, it is determined that the transmission directions are the same.

In one embodiment, when it is determined that the time unit is an aggregation time unit, it is determined that a transmission direction of the time unit is a transmission direction indicated by the format of the DCI, and all time units that are used as aggregation time units have a same transmission direction. During data transmission, all aggregation time units are occupied for data transmission, thereby increasing resources occupied for data transmission, and improving data transmission reliability. In one embodiment, when it is determined that the time unit is not an aggregation time unit, the time unit is not occupied during data transmission, and time units used for aggregation may be non-consecutive. The terminal device may transmit data, an instruction, or the like based on a transmission direction that is of each sub-time unit in the time unit and that is indicated by the format information, thereby improving data transmission flexibility.

In one embodiment, the foregoing process of determining, based on the transmission direction that is of the sub-time unit and that is indicated by the first indication information and the transmission direction that is of the sub-time unit and that is indicated by the format information, whether the time unit is used for aggregation may include the following several implementations.

Implementation 1:

When a transmission direction that is of at least one sub-time unit in the time unit and that is indicated by the first indication information is the same as a transmission direction that is of the at least one sub-time unit and that is indicated by the format information, it is determined that the time unit is an aggregation time unit.

In one embodiment, there are at least N sub-time units in the time unit, which are respectively denoted as sub-time units 1 to N. When each of transmission directions configured in the first indication information for the sub-time units 1 to N is the same as each of transmission directions configured in the format information for the sub-time units 1 to N, it is considered that the time unit is an aggregation time unit. Herein, N is a positive integer.

In one embodiment, when a transmission direction that is of each sub-time unit in the time unit and that is indicated by the first indication information is the same as a transmission direction that is of each sub-time unit and that is indicated by the format information, it may be determined that the time unit is an aggregation time unit.

In this case, a transmission direction of the aggregation time unit is the same as a transmission direction indicated by the first indication information for a sub-time unit in the time unit.

Implementation 2:

When a proportion of a first sub-time unit to at least one sub-time unit in the time unit reaches M, it is determined that the time unit is an aggregation time unit. A transmission direction that is of the first sub-time unit and that is indicated by the first indication information is the same as a transmission direction that is of the first sub-time unit and that is indicated by the format information, and a value of M falls within a range of [0, 1].

In one embodiment, for a sub-time unit in the time unit, if a transmission direction indicated by the first indication information is the same as a transmission direction indicated by the format information, the sub-time unit is denoted as the first sub-time unit. When the proportion of the first sub-time unit in the time unit to the at least one sub-time unit in the time unit reaches M, it is determined that the time unit is an aggregation time unit. In one embodiment, the at least one sub-time unit may be a sub-time unit whose transmission direction is indicated by the first indication information. Herein, M is any real number in 0 to 1. When M is 1, it indicates that at least one sub-time unit in the time unit is the first sub-time unit.

In this case, a transmission direction of the aggregation time unit is the same as a transmission direction indicated by the first indication information for a sub-time unit in the time unit.

Implementation 3:

When a quantity of second sub-time units in the time unit is less than P, it is determined that the time unit is an aggregation time unit. A transmission direction that is of the second sub-time unit and that is indicated by the first indication information is different from a transmission direction that is of the second sub-time unit and that is indicated by the format information, and P is a positive integer.

In one embodiment, for a sub-time unit in the time unit, if a transmission direction indicated by the first indication information is different from a transmission direction indicated by the format information, the sub-time unit is denoted as the second sub-time unit. When the quantity of second sub-time units in the time unit does not reach P, it is determined that the time unit is an aggregation time unit. When the quantity of second sub-time units in the time unit reaches P, it is determined that the time unit is not an aggregation time unit.

In this case, a transmission direction of the aggregation time unit is the same as a transmission direction indicated by the first indication information for a sub-time unit in the time unit.

Implementation 4:

When a proportion of a third sub-time unit to at least one sub-time unit in the time unit is less than Q, it is determined that the time unit is an aggregation time unit. A transmission direction that is of the third sub-time unit and that is indicated by the first indication information is different from a transmission direction that is of the third sub-time unit and that is indicated by the format information, and a value of Q falls within a range of [0, 1].

In one embodiment, for a sub-time unit in the time unit, if a transmission direction indicated by the first indication information is different from a transmission direction indicated by the format information, the sub-time unit is denoted as the third sub-time unit. When the proportion of the third sub-time in the time unit to the at least one sub-time unit in the time unit is less than Q, it is determined that the time unit is an aggregation time unit. When the proportion of the third sub-time in the time unit to the at least one sub-time unit in the time unit is not less than Q, it is determined that the time unit is not an aggregation time unit. In one embodiment, the at least one sub-time unit may be a sub-time unit whose transmission direction is indicated by the first indication information.

In this case, a transmission direction of the aggregation time unit is the same as a transmission direction indicated by the first indication information for a sub-time unit in the time unit.

The communications method provided in this embodiment of this application includes: obtaining the first indication information and the format information; and determining, based on the transmission direction that is of the sub-time unit in the time unit and that is indicated by the first indication information and the transmission direction that is of the sub-time unit and that is indicated by the format information, whether the time unit is an aggregation time unit. In this embodiment, it is determined, based on the transmission direction that is of the sub-time unit in the time unit and that is configured in the first indication information and the transmission direction that is of the sub-time unit and that is configured in the format information, whether the time unit is an aggregation time unit. Therefore, when the time unit is not an aggregation time unit, the time unit is not used for aggregation technology-based data transmission, so that aggregation time units may be nonconsecutive, thereby avoiding a problem that transmission of latency-sensitive data is unfavorable because consecutive time units are directly used as aggregation time units based on a transmission direction indicated by a DCI format and an aggregation factor.

Figure 6:
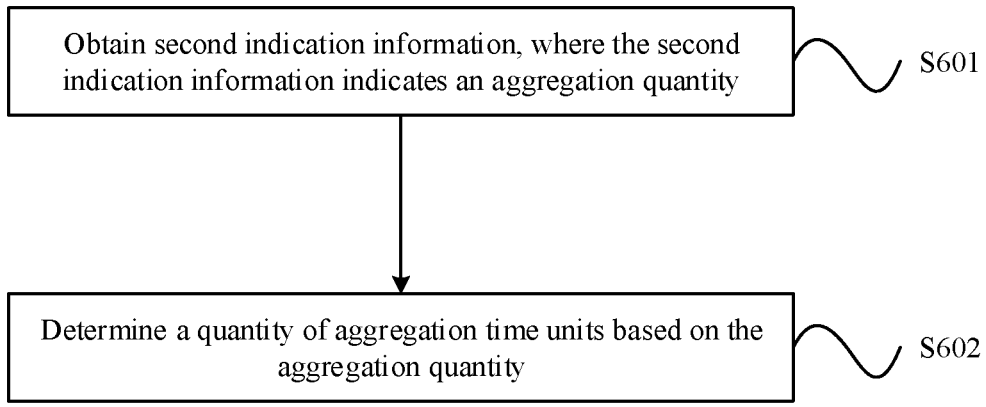
FIG. 6 is a schematic flowchart of a communications method according to Embodiment 2 of this application.

Based on the foregoing embodiment, an embodiment of this application further provides a communications method. FIG. 6 is a schematic flowchart of a communications method according to Embodiment 2 of this application. In this embodiment, a terminal device further receives second indication information indicating an aggregation quantity, and determines a quantity of aggregation time units based on the aggregation quantity. As shown in FIG. 6, the communications method further includes the following operations.

S601. Obtain second indication information, where the second indication information indicates an aggregation quantity.

In one embodiment, the terminal device receives the second indication information sent by a network device. The second indication information may be, for example, an aggregation factor, and indicates the aggregation quantity. A quantity of time units occupied when data transmission is performed between the network device and the terminal device is the aggregation quantity indicated by the aggregation factor. In one embodiment, the network device sends the second indication information to the terminal device by using RRC signaling.

S602. Determine a quantity of aggregation time units based on the aggregation quantity.

In one embodiment, after the aggregation quantity is determined based on the second indication information, it is determined whether a quantity of time units that are used as aggregation time units reaches the aggregation quantity. If the quantity of time units reaches the aggregation quantity, it is determined that the quantity of aggregation time units is the aggregation quantity indicated by the second indication information. If the quantity of time units does not reach the quantity of aggregation time units, a quantity of current aggregation time units is determined, and the operation of determining whether the time unit is an aggregation time unit in the embodiment shown in FIG. 5 is performed again.

In one embodiment, S601 and S602 in this embodiment may be performed after S502 in the embodiment shown in FIG. 5.

The communications method provided in this embodiment includes: obtaining the second indication information, where the second indication information indicates the aggregation quantity; and determining the quantity of aggregation time units based on the aggregation quantity. In this embodiment, the terminal device determines the aggregation quantity based on the second indication information, determines the quantity of aggregation time units based on the aggregation quantity, and determines, based on the quantity of aggregation time units, an aggregation time unit used for data transmission.

Figure 7:
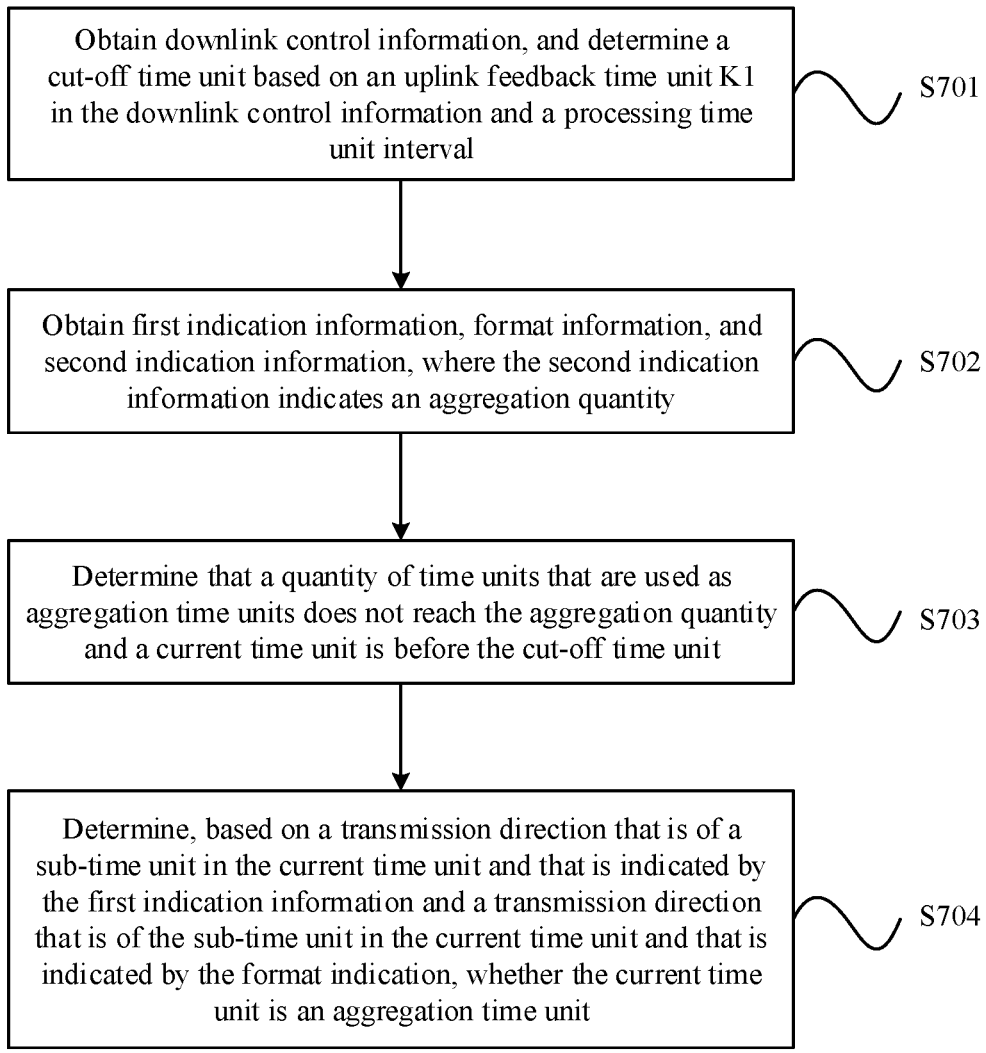
FIG. 7 is a schematic flowchart of a communications method according to Embodiment 3 of this application.

In one embodiment, based on the foregoing embodiment, an embodiment of this application further provides a communications method, to describe a process of determining, when a format of DCI indicates downlink data transmission, whether a current time unit is an aggregation time unit. FIG. 7 is a schematic flowchart of a communications method according to Embodiment 3 of this application. As shown in FIG. 7, the communications method includes the following operations.

S701. Obtain downlink control information.

In one embodiment, a terminal device receives the DCI sent by a network device.

S702. Obtain first indication information, format information, and second indication information, where the second indication information indicates an aggregation quantity.

In one embodiment, a manner of obtaining the first indication information, the format information, and the second indication information may be shown in any one of the foregoing embodiments. Details are not described in this embodiment again.

S703. Determine a cut-off time unit based on an uplink feedback time unit K1 in the downlink control information and a processing time unit interval.

In one embodiment, the DCI carries the uplink feedback time unit K1, and the processing time unit interval is a time interval that needs to be occupied by the terminal device to process downlink data. Therefore, none of time units in the time interval before the time unit K1 can be used as an aggregation time unit. Therefore, the cut-off time unit may be determined based on K1 and the processing time unit interval, and the cut-off time unit is before K1. For example, the processing time unit interval may be predefined by the terminal device and the network device, or may be sent by the network device to the terminal device by using signaling.

S704. Determine that a quantity of time units that are used as aggregation time units does not reach the aggregation quantity and that a current time unit is before the cut-off time unit.

For example, before it is determined whether the current time unit is an aggregation time unit, if it is determined that the quantity of time units that are used as aggregation time units has reached the aggregation quantity, a process of determining an aggregation time unit may be ended. In addition, if it is determined that the current time unit is not before the cut-off time unit, it indicates that no time unit can be used to transmit the downlink data. In this case, the terminal device cannot upload feedback information in the uplink feedback time unit K1. Therefore, a process of determining an aggregation time unit is also ended.

S705. Determine, based on a transmission direction that is of a sub-time unit in the current time unit and that is indicated by the first indication information and a transmission direction that is of the sub-time unit in the current time unit and that is indicated by the format indication, whether the current time unit is an aggregation time unit.

For example, a manner of determining whether the current time unit is an aggregation time unit in this embodiment is the same as the manner of determining whether the time unit is an aggregation time unit in the embodiment shown in FIG. 5. Details are not described in this application again.

According to the communications method provided in this embodiment of this application, whether the current time unit is an aggregation time unit is described as an example. In one embodiment, the communications method includes: obtaining the downlink control information; determining the cut-off time unit based on the uplink feedback time unit K1 in the downlink control information and the processing time unit interval; obtaining the first indication information, the format information, and the second indication information, where the second indication information indicates the aggregation quantity; determining that the quantity of time units that are used as aggregation time units does not reach the aggregation quantity and the current time unit is before the cut-off time unit; and determining, based on the transmission direction that is of the sub-time unit in the current time unit and that is indicated by the first indication information and the transmission direction that is of the sub-time unit in the current time unit and that is indicated by the format indication, whether the current time unit is an aggregation time unit. In this embodiment, it is determined, based on the transmission direction that is of the sub-time unit in the time unit and that is configured in the first indication information and the transmission direction that is of the sub-time unit and that is configured in the format information, whether the time unit is an aggregation time unit. Therefore, when the time unit is not an aggregation time unit, the time unit is not used for aggregation technology-based data transmission, so that aggregation time units may be nonconsecutive, thereby avoiding a problem that transmission of latency-sensitive data is unfavorable because consecutive time units are directly used as aggregation time units based on a transmission direction indicated by a DCI format and an aggregation factor.

Figure 8:
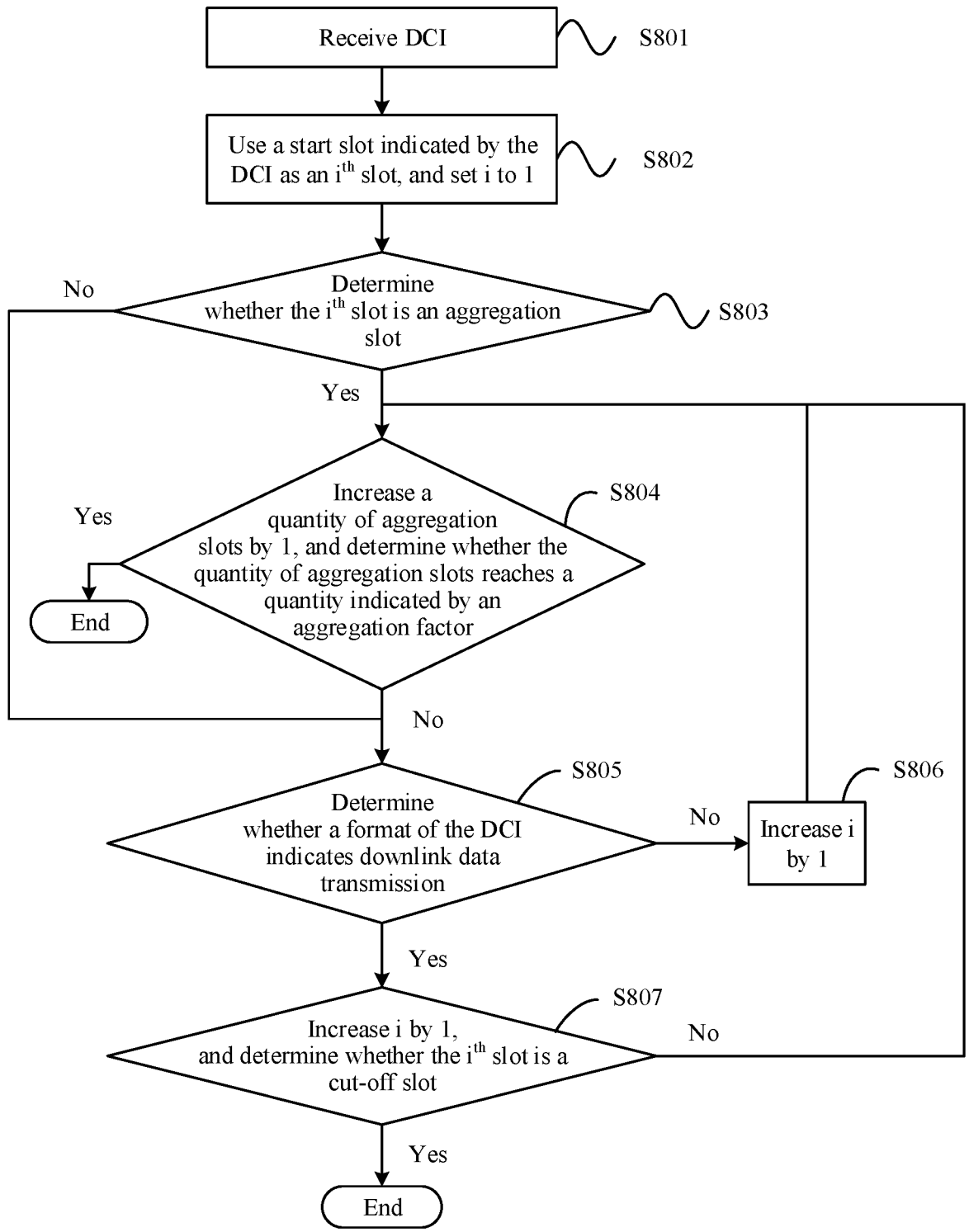
FIG. 8 is a schematic flowchart of a communications method according to Embodiment 4 of this application.

In one embodiment, based on any one of the foregoing embodiments, FIG. 8 is a schematic flowchart of a communications method according to Embodiment 4 of this application. In this embodiment, a process in which a terminal device obtains all aggregation slots used for aggregation is described. As shown in FIG. 8, the communications method includes the following operations.

S801. Receive DCI.

For example, the terminal device receives the DCI sent by a network device, where the DCI carries start slot information.

S802. Use a start slot of the DCI as an $i^{th}$ slot, and set i to 1.

For example, when a format of the DCI indicates downlink data transmission, a K0 slot is used as a first slot. When a format of the DCI indicates uplink data transmission, a K2 slot is used as a first slot.

S803. Determine whether the $i^{th}$ slot is an aggregation slot. If the $i^{th}$ slot is an aggregation slot, perform S804. If the $i^{th}$ slot is not an aggregation slot, perform S805.

For example, the method for determining whether the time unit is an aggregation time unit in the embodiment shown in FIG. 5 is used to determine whether the $i^{th}$ slot is an aggregation slot. Details are not described in this application again.

S804. Increase a quantity of aggregation slots by 1, and determine whether the quantity of aggregation slots reaches a quantity indicated by an aggregation factor. If the quantity of aggregation slots reaches the quantity indicated by the aggregation factor, end the process. If the quantity of aggregation slots does not reach the quantity indicated by the aggregation factor, perform S805.

For example, when the $i^{th}$ slot is an aggregation slot, the quantity of aggregation slots is increased by 1. An initial value of the quantity of aggregation slots is 0. It is determined whether a modified quantity of aggregation slots reaches the quantity indicated by the aggregation factor. If the modified quantity of aggregation slots reaches the quantity indicated by the aggregation factor, all slots that need to be used as aggregation slots are obtained. If the modified quantity of aggregation slots does not reach the quantity indicated by the aggregation factor, aggregation slots used for aggregation continue to be obtained.

S805. Determine whether the format of the DCI indicates downlink data transmission. If the format of the DCI indicates downlink data transmission, perform S807. If the format of the DCI does not indicate downlink data transmission, perform S806.

For example, it is determined, based on the format of the DCI, whether uplink data transmission or downlink data transmission is performed.

S806. Increase i by 1, and perform S804.

For example, when it is determined, based on the format of the DCI, that uplink data transmission is performed, i is increased by 1, for example, it is determined whether a second slot is an aggregation slot.

S807. Increase i by 1, and determine whether the $i^{th}$ slot is a cut-off slot. If the $i^{th}$ slot is a cutoff slot, end the process. If the $i^{th}$ slot is not a cutoff slot, perform S804.

For example, when it is determined, based on the format of the DCI, that downlink data transmission is performed, it is further determined whether the $i^{th}$ slot is a cut-off slot. A manner of obtaining the cut-off slot is shown in the embodiment in FIG. 7. Details are not described in this application again.

In this embodiment, it is determined, based on the transmission direction that is of the sub-time unit in the time unit and that is configured in the first indication information and the transmission direction that is of the sub-time unit and that is configured in the format information, whether the time unit is an aggregation time unit. Therefore, when the time unit is not an aggregation time unit, the time unit is not used for aggregation technology-based data transmission, so that aggregation time units may be nonconsecutive, thereby avoiding a problem that transmission of latency-sensitive data is unfavorable because consecutive time units are directly used as aggregation time units based on a transmission direction indicated by a DCI format and an aggregation factor.

Another aspect of the embodiments of this application further provides a communications method, and the method is performed by a network device, and has technical features and technical effects corresponding to the embodiments shown in FIG. 5 to FIG. 8. Details are not described in this application again.

Figure 9:
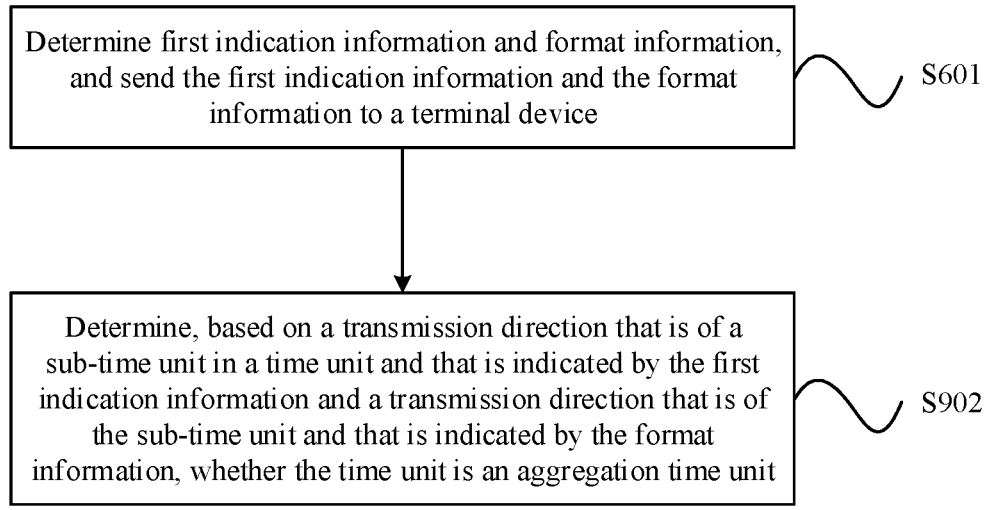
FIG. 9 is a schematic flowchart of a communications method according to Embodiment 5 of this application.

FIG. 9 is a schematic flowchart of a communications method according to Embodiment 5 of this application. As shown in FIG. 9, the communications method includes the following operations.

S901. Determine first indication information and format information.

S902. Determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a transmission direction that is of at least one sub-time unit in the time unit and that is indicated by the first indication information is the same as a transmission direction that is of the at least one sub-time unit and that is indicated by the format information, determining that the time unit is an aggregation time unit.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a proportion of a first sub-time unit to at least one sub-time unit in the time unit reaches M, determining that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a quantity of second sub-time units in the time unit is less than P, determining that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the determining, based on a transmission direction that is of a sub-time unit in a time unit and that is indicated by the first indication information and a transmission direction that is of the sub-time unit and that is indicated by the format information, whether the time unit is an aggregation time unit includes:

when a proportion of a third sub-time unit to at least one sub-time unit in the time unit is less than Q, determining that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the communications method further includes the following operations:

S11. Determine second indication information, where the second indication information indicates an aggregation quantity.

S12. Determine a quantity of aggregation time units based on the aggregation quantity.

In one embodiment, the communications method further includes:

sending at least one of the first indication information, the format information, and the second indication information to a terminal device.

Another aspect of the embodiments of this application further provides a communications apparatus, configured to perform the communications methods in the embodiments shown in FIG. 5 to FIG. 8, and having a same or similar technical feature and technical effect.

Figure 10:
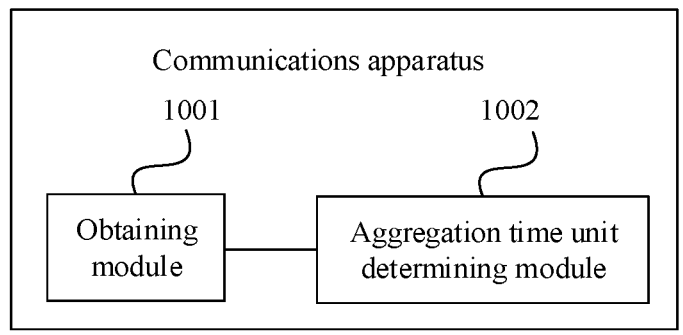
FIG. 10 is a schematic structural diagram of a communications apparatus according to Embodiment 1 of this application.

FIG. 10 is a schematic structural diagram of a communications apparatus according to Embodiment 1 of this application. As shown in FIG. 10, the communications apparatus includes:

an obtaining module 1001, configured to obtain first indication information and format information; and an aggregation time unit determining module 1002, configured to determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the aggregation time unit determining module 1002 is configured to:

when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the aggregation time unit determining module 1002 is configured to:

when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the aggregation time unit determining module 1002 is configured to:

when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the aggregation time unit determining module 1002 is configured to:

when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the obtaining module 1001 is further configured to obtain second indication information, where the second indication information indicates an aggregation quantity; and the aggregation time unit determining module 1002 is further configured to determine a quantity of aggregation time units based on the aggregation quantity.

Another aspect of the embodiments of this application further provides a communications apparatus, configured to perform the communications method in the embodiment shown in FIG. 9, and having a same or similar technical feature and technical effect.

Figure 11:
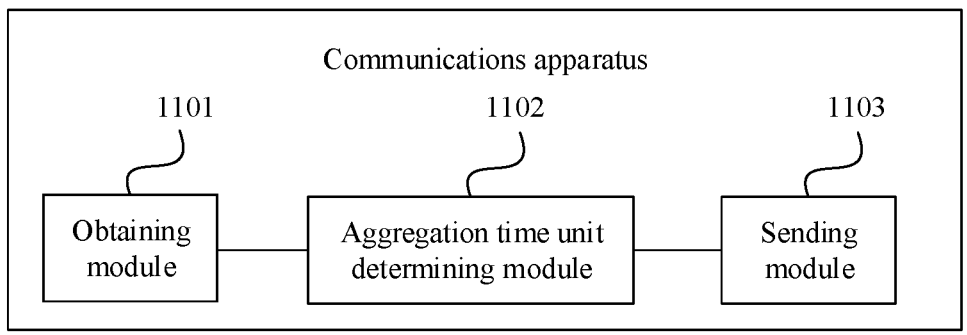
FIG. 11 is a schematic structural diagram of a communications apparatus according to Embodiment 2 of this application.

FIG. 11 is a schematic structural diagram of a communications apparatus according to Embodiment 2 of this application. As shown in FIG. 11, the communications apparatus includes:

an obtaining module 1101, configured to determine first indication information and format information; and an aggregation time unit determining module 1102, configured to determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the aggregation time unit determining module 1102 is configured to:

when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the aggregation time unit determining module 1102 is configured to:

when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the aggregation time unit determining module 1102 is configured to:

when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the aggregation time unit determining module 1102 is configured to:

when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the obtaining module 1101 is further configured to obtain second indication information, where the second indication information indicates an aggregation quantity; and the aggregation time unit determining module is further configured to determine a quantity of aggregation time units based on the aggregation quantity.

In one embodiment, as shown in FIG. 11, the communications apparatus further includes:

a sending module 1103, configured to send at least one of the first indication information, the format information, and the second indication information to a terminal device.

Another aspect of the embodiments of this application further provides a terminal device, configured to perform the communications methods in the embodiments shown in FIG. 5 to FIG. 8, and having a same or similar technical feature and technical effect.

Figure 12:
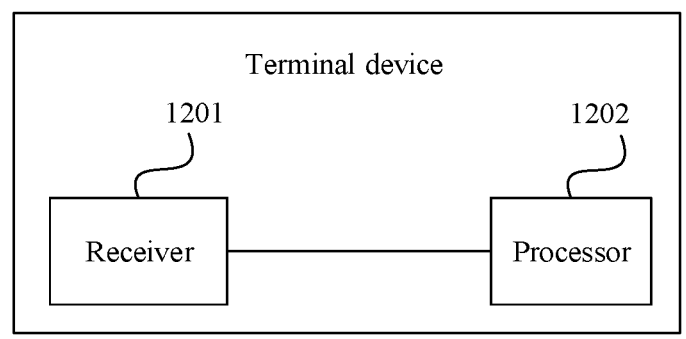
FIG. 12 is a schematic structural diagram of a terminal device according to Embodiment 1 of this application.

FIG. 12 is a schematic structural diagram of a terminal device according to Embodiment 1 of this application. As shown in FIG. 12, the terminal device includes:

a receiver 1201, configured to obtain first indication information and format information; and a processor 1202, configured to determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the processor 1202 is configured to:

when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the processor 1202 is configured to:

when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the processor 1202 is configured to:

when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the processor 1202 is configured to:

when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the receiver 1201 is further configured to obtain second indication information, where the second indication information indicates an aggregation quantity; and the processor 1202 is further configured to determine a quantity of aggregation time units based on the aggregation quantity.

Another aspect of the embodiments of this application further provides a network device, configured to perform the communications method in the embodiment shown in FIG. 9, and having a same or similar technical feature and technical effect.

Figure 13:
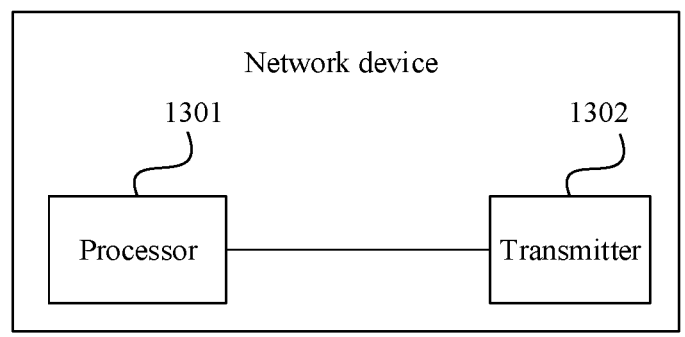
FIG. 13 is a schematic structural diagram of a network device according to Embodiment 1 of this application.

FIG. 13 is a schematic structural diagram of a network device according to Embodiment 1 of this application. As shown in FIG. 13, the network device includes:

a processor 1301, configured to: determine first indication information and format information; and determine, based on a transmission direction that is of a sub-time unit in a time unit and that is indicated by the first indication information and a transmission direction that is of the sub-time unit and that is indicated by the format information, whether the time unit is an aggregation time unit.

In one embodiment, the processor 1301 is configured to:
when a transmission direction that is of at least one sub-time unit in the time unit and that is indicated by the first indication information is the same as a transmission direction that is of the at least one sub-time unit and that is indicated by the format information, determine that the time unit is an aggregation time unit.

In one embodiment, the processor 1301 is configured to:
when a proportion of a first sub-time unit to at least one sub-time unit in the time unit reaches M, determine that the time unit is an aggregation time unit, where a transmission direction that is of the first sub-time unit and that is indicated by the first indication information is the same as a transmission direction that is of the first sub-time unit and that is indicated by the format information, and a value of M falls within a range of [0, 1].

In one embodiment, the processor 1301 is configured to:
when a quantity of second sub-time units in the time unit is less than P, determine that the time unit is an aggregation time unit, where a transmission direction that is of the second sub-time unit and that is indicated by the first indication information is different from a transmission direction that is of the second sub-time unit and that is indicated by the format information, and P is a positive integer.

In one embodiment, the processor 1301 is configured to:
when a proportion of a third sub-time unit to at least one sub-time unit in the time unit is less than Q, determine that the time unit is an aggregation time unit, where a transmission direction that is of the third sub-time unit and that is indicated by the first indication information is different from a transmission direction that is of the third sub-time unit and that is indicated by the format information, and a value of Q falls within a range of [0, 1].

In one embodiment, the processor 1301 is further configured to obtain second indication information, where the second indication information indicates an aggregation quantity; and
the processor is further configured to determine a quantity of aggregation time units based on the aggregation quantity.

In one embodiment, the network device further includes:
a transmitter 1302, configured to send at least one of the first indication information, the format information, and the second indication information to a terminal device.

Figure 14:
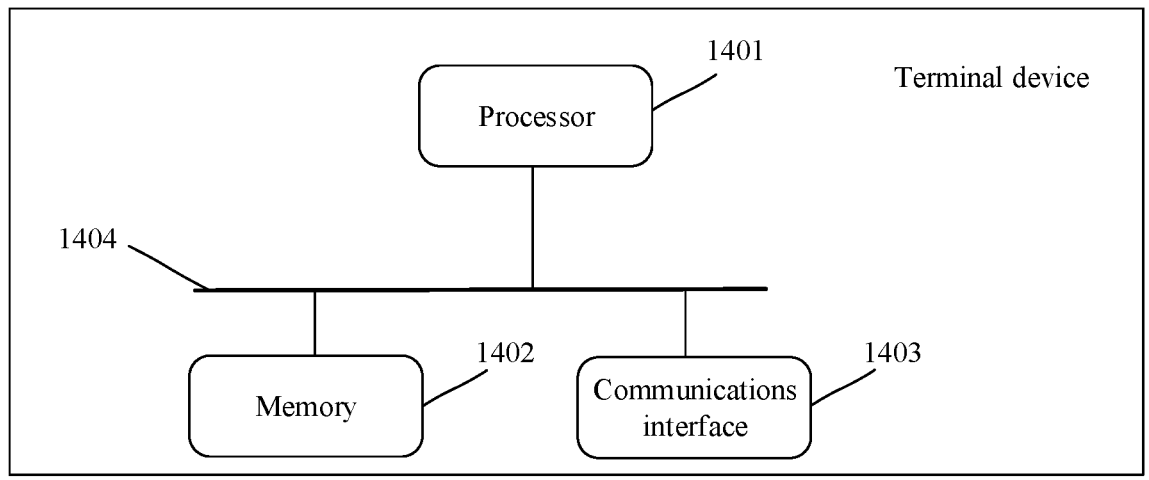
FIG. 14 is a schematic structural diagram of a terminal device according to Embodiment 2 of this application.

Still another aspect of the embodiments of this application further provides a terminal device. FIG. 14 is a schematic structural diagram of a terminal device according to Embodiment 2 of this application. As shown in FIG. 14, the terminal device includes a processor 1401, a memory 1402, a communications interface 1403, and a bus 1404.

The processor 1401, the memory 1402, and the communications interface 1403 are connected and communicate by using the bus 1404. The memory 1402 is configured to store a computer executable instruction. When the device is run, the processor 1401 executes the computer executable instruction in the memory 1402 to perform, by using a hardware resource in the device, the operations in the communications methods corresponding to FIG. 5 to FIG. 8.

Figure 15:
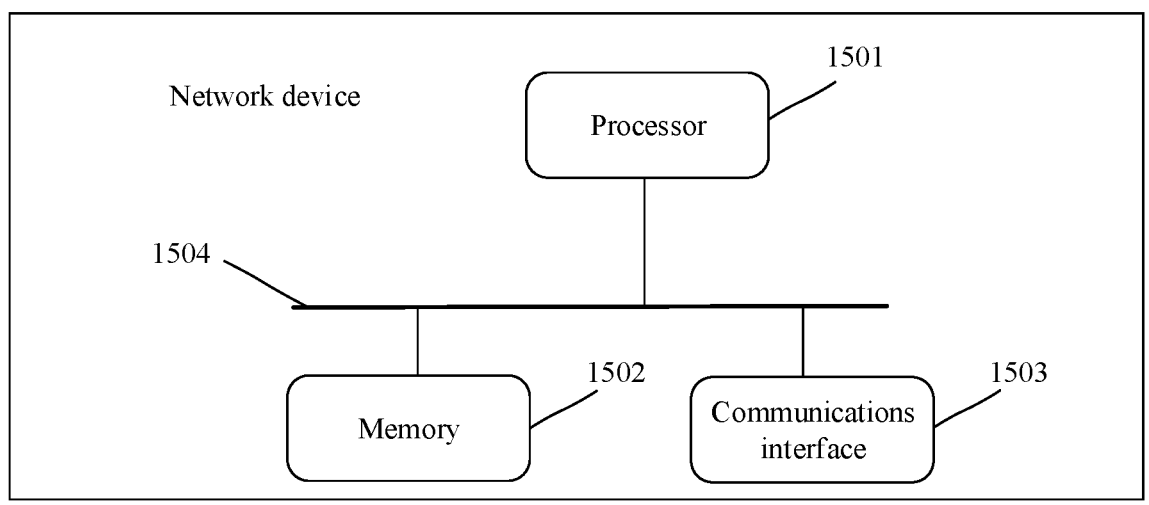
FIG. 15 is a schematic structural diagram of a network device according to Embodiment 2 of this application.

Still another aspect of the embodiments of this application further provides a network device. FIG. 15 is a schematic structural diagram of a network device according to Embodiment 2 of this application. As shown in FIG. 15, the network device includes a processor 1501, a memory 1502, a communications interface 1503, and a bus 1504.

The processor 1501, the memory 1502, and the communications interface 1503 are connected and communicate by using the bus 1504. The memory 1502 is configured to store a computer executable instruction. When the device is run, the processor 1501 executes the computer executable instruction in the memory 1502 to perform, by using a hardware resource in the device, the operations in the communications method corresponding to FIG. 9.

Another aspect of this application further provides a communications system. As shown in FIG. 1, the communications system includes the terminal device shown in FIG. 12 or FIG. 14 and the network device shown in FIG. 13 or FIG. 15.

Another aspect of this application further provides a terminal device, including a memory, a processor, and a computer program. The computer program is stored in the memory, and the processor runs the computer program to perform the operations in the communications methods corresponding to FIG. 5 to FIG. 8.

Another aspect of this application further provides a network device, including a memory, a processor, and a computer program. The computer program is stored in the memory, and the processor runs the computer program to perform the operations in the communications method corresponding to FIG. 9.

Another aspect of this application further provides a computer storage medium. The storage medium includes a computer program, and the computer program is used to implement the operations in the communications methods corresponding to FIG. 5 to FIG. 8.

Another aspect of this application further provides a computer storage medium. The storage medium includes a computer program, and the computer program is used to implement the operations in the communications method corresponding to FIG. 9.

Another aspect of this application further provides a computer program product. The computer program product includes computer program code. When the computer program code is run on a computer, the computer is enabled to perform the operations in the communications methods corresponding to FIG. 5 to FIG. 8.

Another aspect of this application further provides a computer program product. The computer program product includes computer program code. When the computer program code is run on a computer, the computer is enabled to perform the operations in the communications method corresponding to FIG. 9.

Another aspect of this application further provides a chip, including a memory and a processor. The memory is configured to store a computer program, and the processor is configured to invoke the computer program from the memory and run the computer program, so that a communications device in which the chip is installed is enabled to perform the operations in the communications methods corresponding to FIG. 5 to FIG. 8.

Another aspect of this application further provides a chip, including a memory and a processor. The memory is configured to store a computer program, and the processor is configured to invoke the computer program from the memory and run the computer program, so that a communications device in which the chip is installed is enabled to perform the operations in the communications method corresponding to FIG. 9.

Another aspect of this application further provides a first apparatus, including at least one processor and at least one memory. The processor is configured to perform any one of the communications methods corresponding to FIG. 5 to FIG. 9, and the at least one memory is coupled to the at least one processor.

Another aspect of this application further provides a second apparatus, including at least one processor and at least one memory. The at least one memory is coupled to the at least one processor, the at least one memory is configured to store computer program code or a computer instruction, and when the one or more processors execute the computer program code or the computer instruction, the apparatus performs any one of the communications methods corresponding to FIG. 5 to FIG. 9.

Another aspect of this application further provides a third apparatus, including at least one processor. The processor is configured to perform any one of the communications methods corresponding to FIG. 5 to FIG. 9.

Another aspect of this application further provides a fourth apparatus, including at least one communications interface, configured to perform sending and receiving operations in any one of the communications methods corresponding to FIG. 5 to FIG. 9. Further, the apparatus may further include at least one processor, configured to perform processing operations in any one of the communications methods corresponding to FIG. 5 to FIG. 9. The at least one processor is coupled to the at least one communications interface.

In one embodiment, the foregoing processing operations include determining whether the time unit is an aggregation time unit, and the like. In one embodiment, the foregoing sending and receiving operations include implementing information exchange inside the apparatus, or implementing transmission between a network device and a communications device.

Another aspect of this application further provides a computer storage medium, including a computer instruction. When the computer instruction is run on an apparatus, the apparatus is enabled to perform any one of the communications methods corresponding to FIG. 5 to FIG. 9.

Another aspect of this application further provides a computer program product. When the computer program product is run on a computer, the computer is enabled to perform any one of the communications methods corresponding to FIG. 5 to FIG. 9.

Another aspect of this application further provides a chip. The chip exists in a form of an apparatus. The chip may be anyone of the first apparatus, the second apparatus, the third apparatus, the fourth apparatus, the computer storage medium, and the computer program product.

Another aspect of this application further provides a time-frequency resource allocation table. The following describes the time-frequency resource allocation table in detail. The time-frequency resource allocation table in the following embodiments may be used as the time-frequency resource allocation table in the embodiments shown in FIG. 5 to FIG. 9, and is used to determine K0/K2, SLIV information, and the like.

In one embodiment, after a terminal device completes initial access, a network device configures an uplink time-domain resource allocation table for uplink scheduling of the terminal device in RRC signaling, and configures a downlink time-domain resource allocation table for downlink scheduling of the terminal device. The time-domain resource allocation table may be shown in Table 5, and includes, for example, content of four rows and five columns. Parameters in the five columns are respectively an index number of a quantity of rows of the table, K0, a start symbol of scheduled data, a quantity of symbols of the scheduled data, and a scheduling type. The time-domain resource allocation table may alternatively include content of four rows and four columns. Parameters in the four columns are respectively an index number of a quantity of rows of the table, K0, a start symbol and length SLIV of scheduled data, and a resource mapping type. Therefore, the network device may indicate time-domain resource allocation information to the terminal device by sequentially including 2-bit indication information in downlink control indication DCI for uplink scheduling and downlink scheduling.

A method for determining a time-domain resource allocation table is determining different tables based on different CP types. For time-domain resource scheduling of fallback DCI, a corresponding table is predefined. For time-domain resource scheduling of non-fallback DCI, a corresponding table is configured by using the RRC signaling. By considering different CP types and different data mapping types, a value range of the SLIV may be further restricted, so that identifiers of a relatively small quantity of bits are used to indicate resource allocation, thereby reducing overheads.

In an initial access process of the terminal device, the network device cannot configure the time-domain resource allocation table for the terminal device by using the RRC signaling, and needs to predefine the time-domain resource allocation table. In one embodiment, an uplink time-domain resource allocation table is predefined for uplink fallback DCI such as DCI format 0_0. When the SLIV is used to indicate the start symbol and the quantity of symbols for data scheduling in the table, the table has four columns. If a column of the start symbol column and a column of the quantity of symbols are used to indicate the start symbol and the quantity of symbols respectively, the table has five columns. Selection of a quantity of rows of the table is related to a quantity of predefined K0/K2 values and SLIV values. The quantity of rows of the table may be 4, 8, or the like. Therefore, the time-domain resource allocation information may be indicated to the terminal device by occupying only two or three bits in the DCI.

In one embodiment, different time-domain resource allocation tables may be set for different CP types. For example, one table is predefined for each of an NCP and an ECP, as shown in Table 6 and Table 7, or one table shared by an NCP and an ECP is predefined, as shown in Table 8. Different tables are predefined for the NCP and the ECP, so that overheads of a quantity of bits of time-domain indication information in the DCI can be reduced. One table is predefined for each of the NCP and the ECP, so that processing complexity of the UE can be reduced.

For an NCP uplink fallback DCI table, a value of K2 may be 1, 2, 3, 4, 5, 6, 7, or 8, and the value of K2 considers different data processing capabilities of different UEs, to meet capability and fallback requirements of different UEs. When a PUSCH mapping type is B, a start symbol of the PUSCH may be 0, 1, 2, 3, or 4, and a quantity of symbols of the PUSCH may be 2, 4, 7, 8, 10, 12, or 14. For slot scheduling, symbols in one slot other than a symbol occupied by a control channel are used for data transmission, thereby maximizing actual available resources of the UE. For non-slot scheduling, a quantity of symbols may be 2, 4, or 7, to shorten a scheduling latency. When the PUSCH mapping type is A, the start symbol of the PUSCH may be 0, and the quantity of symbols of the PUSCH may be 2, 4, 8, 10, 12, or 14. A plurality of possible symbols of the PUSCH maximize scheduling flexibility. As shown in Table 6, the second column is a value of K2, and the value of K2 is 2. When a PUSCH mapping type is B, a start symbol of the PUSCH is 0 or 2, and a quantity of symbols of the PUSCH may be 2, 4, 7, or 10. When the PUSCH mapping type is A, the start symbol of the PUSCH is 0, and the quantity of symbols of the PUSCH is 12.

For an NCP downlink fallback DCI table, a value of K0 may be 0, and that the value of K0 is 0 may shorten a time for processing data received by the UE, and shorten a data scheduling latency. When a PDSCH mapping type is B, a start symbol location of the PDSCH may be 0, 1, 2, 3, or 4, and a quantity of symbols of the PDSCH may be 2, 4, or 7. The possible start location of the PDSCH is determined based on a quantity of symbols that may be occupied by a downlink control channel, and the quantity of symbols is determined based on a quantity of scheduled symbols that can be satisfied in the PDSCH mapping rule B, thereby maximizing scheduling flexibility. When the PDSCH mapping type is A, the start symbol location of the PDSCH may be 0, 1, 2, or 3, and the quantity of symbols of the PDSCH may be 7, 9, 11, or 14. Symbols in one slot other than a symbol occupied by a control channel are used for data transmission, thereby maximizing actual available resources of the UE. As shown in Table 9, the second column is a value of K0, and the value of K0 is 0. When a PDSCH mapping type is B, a start symbol of the PDSCH is 0, and a quantity of symbols of the PDSCH may be 2, 4, or 7. When the PDSCH mapping type is A, the start symbol of the PDSCH is 0, and the quantity of symbols of the PDSCH is 12.

For an ECP uplink fallback DCI table, a value of K2 may be 1, 2, 3, 4, 5, 6, 7, or 8. When a PUSCH mapping type is B, a start symbol of the PUSCH may be 0, 1, 2, 3, or 4, and a quantity of symbols of the PUSCH may be 2, 4, 6, 8, 10, or 12. When the PUSCH mapping type is A, the start symbol of the PUSCH may be 0, and the quantity of symbols of the PUSCH may be 2, 4, 8, 10, or 12. Selection rules and beneficial effects of different parameters are the same as those of the NCP uplink fallback DCI. As shown in Table 7, the second column is a value of K2, and the value of K2 is 2. When a PUSCH mapping type is B, a start symbol of the PUSCH is 0 or 2, and a quantity of symbols of the PUSCH may be 2, 4, 6, or 8. When the PUSCH mapping type is A, the start symbol of the PUSCH is 0, and the quantity of symbols of the PUSCH is 10.

For an ECP downlink fallback DCI table, the second column is a value of K0, and the value of K0 may be 0. When a PDSCH mapping type is B, a start symbol location of the PDSCH may be 0, 1, 2, 3, or 4, and a quantity of symbols the PDSCH may be 2, 4, or 6. When the PDSCH mapping type is A, the start symbol location of the PDSCH may be 0, 1, 2, or 3, and the quantity of symbols the PDSCH may be 5, 7, 8, 9, 10, or 12. Selection rules and beneficial effects of different parameters are the same as those of the NCP downlink fallback DCI.

For an NCP and ECP shared uplink fallback DCI table, the second column is a value of K2, and the value of K2 may be 1, 2, 3, 4, 5, 6, 7, or 8. When a PUSCH mapping type is B, a start symbol of the PUSCH may be 0, 1, 2, 3, or 4, and a quantity of symbols of the PUSCH may be 2, 4, 6, 7, 8, 10, 12, or 14. When the PUSCH mapping type is A, the start symbol of the PUSCH may be 0, and the quantity of symbols of the PUSCH may be 2, 4, 8, 10, 12, or 14. Selection rules and beneficial effects of different parameters are the same as those of the NCP uplink fallback DCI.

For an NCP and ECP shared downlink fallback DCI table, the second column is a value of K0, and the value of K0 may be 0. When a PDSCH mapping type is B, a start symbol location of the PDSCH may be 0, 1, 2, 3, or 4, and a quantity of symbols of the PDSCH may be 2, 4, 6, or 7. When the PDSCH mapping type is A, the start symbol location of the PDSCH may be 0, 1, 2, or 3, and the quantity of symbols of the PDSCH may be 8, 10, 12, or 14. Selection rules and beneficial effects of different parameters are the same as those of the NCP downlink fallback DCI.

In one embodiment, uplink fallback DCI and downlink fallback DCI may use a same predefined table. Table 6 to Table 8 are as follows:

TABLE 6

Example of a time-domain resource indication table for NCP uplink fallback DCI

| Index index | K2 | Start symbol start | Quantity of symbols length | PUSCH mapping type (PUSCH mapping type) |
|---|---|---|---|---|
| 0 | 2 | 0 | 2 | Type B |
| 1 | 2 | 0 | 4 | Type B |
| 2 | 2 | 0 | 7 | Type B |
| 3 | 2 | 0 | 12 | Type A |
| 4 | 2 | 2 | 2 | Type B |
| 5 | 2 | 2 | 4 | Type B |
| 6 | 2 | 2 | 7 | Type B |
| 7 | 2 | 2 | 10 | Type B |

TABLE 7

Example of a time-domain resource indication table for ECP uplink fallback DCI

| Index | K2 | Start symbol | Quantity of symbols | PUSCH mapping type |
|---|---|---|---|---|
| 0 | 2 | 0 | 2 | Type B |
| 1 | 2 | 0 | 4 | Type B |
| 2 | 2 | 0 | 6 | Type B |
| 3 | 2 | 0 | 10 | Type A |
| 4 | 2 | 2 | 2 | Type B |
| 5 | 2 | 2 | 4 | Type B |
| 6 | 2 | 2 | 6 | Type B |
| 7 | 2 | 2 | 8 | Type B |

TABLE 8

Example of a time-domain resource indication table for NCP + ECP uplink fallback DCI

| Index | K2 | Start symbol | Quantity of symbols | PUSCH mapping type |
|---|---|---|---|---|
| 0 | 2 | 0 | 2 | Type B |
| 1 | 2 | 0 | 4 | Type B |
| 2 | 2 | 0 | 6 | Type B |
| 3 | 2 | 0 | 7 | Type B |
| 4 | 2 | 0 | 10 | Type A |
| 5 | 2 | 0 | 12 | Type A |
| 6 | 2 | 2 | 2 | Type B |
| 7 | 2 | 2 | 4 | Type B |
| 8 | 2 | 2 | 6 | Type B |
| 9 | 2 | 2 | 7 | Type B |
| 10 | 2 | 2 | 8 | Type B |
| 11 | 2 | 2 | 10 | Type B |

In one embodiment, a downlink time-domain resource allocation table is predefined for downlink fallback DCI such as DCI format 1_0. When the SLIV is used to indicate the start symbol and the quantity of symbols for data scheduling in the table, the table has four columns. If a column of the start symbol and a column of the quantity of symbols are used to indicate the start symbol and the quantity of symbols respectively, the table has five columns. Selection of a quantity of rows of the table is related to a quantity of predefined K0/K2 values and SLIV values. The quantity of rows of the table may be 4, 8, or the like. The time-domain resource allocation information may be indicated to the terminal device by occupying only two or three bits in the DCI. In one embodiment, different time-domain resource allocation tables may be set for different CP types. For example, one table is predefined for each of an NCP and an ECP, as shown in Table 9 and Table 10, or one table shared by an NCP and an ECP is predefined, as shown in Table 11. Table 9 to Table 11 are as follows:

TABLE 9

Example of a time-domain resource indication table for NCP downlink fallback DCI

| Index | K0 | Start symbol | Quantity of symbols | PDSCH mapping type |
|---|---|---|---|---|
| 0 | 0 | 0 | 2 | Type B |
| 1 | 0 | 0 | 4 | Type B |
| 2 | 0 | 0 | 7 | Type B |
| 3 | 0 | 0 | 12 | Type A |

TABLE 10

Example of a time-domain resource indication table for ECP downlink fallback DCI

| Index | K0 | Start symbol | Quantity of symbols | PDSCH mapping type |
|---|---|---|---|---|
| 0 | 0 | 0 | 2 | Type B |
| 1 | 0 | 0 | 4 | Type B |
| 2 | 0 | 0 | 6 | Type B |
| 3 | 0 | 0 | 10 | Type A |

TABLE 11

Example of a time-domain resource indication table for NCP + ECP downlink fallback DCI

| Index | K0 | Start symbol | Quantity of symbols | PDSCH mapping type |
|---|---|---|---|---|
| 0 | 0 | 0 | 2 | Type B |
| 1 | 0 | 0 | 4 | Type B |
| 2 | 0 | 0 | 6 | Type B |
| 3 | 0 | 0 | 7 | Type B |
| 4 | 0 | 0 | 10 | Type A |
| 5 | 0 | 0 | 12 | Type A |

For example, the table predefined for the NCP downlink fallback DCI may alternatively be at least one row in Table 12 and Table 13, and the table predefined for the NCP uplink fallback DCI may alternatively be at least one row in Table 14.

TABLE 12

Example of a time-domain resource indication table for NCP downlink fallback DCI

| Index | K0 | Start | Length | PDSCH mapping type |
|---|---|---|---|---|
| 0 | 0 | 2 | 12 | Type A |
| 1 | 0 | 2 | 10 | Type A |
| 2 | 0 | 2 | 9 | Type A |
| 3 | 0 | 2 | 8 | Type A |
| 4 | 0 | 3 | 11 | Type A |
| 5 | 0 | 3 | 9 | Type A |
| 6 | 0 | 3 | 8 | Type A |
| 7 | 0 | 3 | 7 | Type A |

TABLE 13

Example of a time-domain resource indication table for NCP downlink fallback DCI

| Index | K0 | Start | Length | PDSCH mapping type |
|---|---|---|---|---|
| 0 | 0 | 2 | 12 | Type A |
| 1 | 0 | 2 | 11 | Type A |
| 2 | 0 | 2 | 10 | Type A |
| 3 | 0 | 2 | 9 | Type A |
| 4 | 0 | 3 | 11 | Type A |
| 5 | 0 | 3 | 10 | Type A |
| 6 | 0 | 3 | 9 | Type A |
| 7 | 0 | 3 | 8 | Type A |

TABLE 14

Example of a time-domain resource indication table for NCP uplink fallback DCI

| Index | K2 | Start | Length | PUSCH mapping type |
|---|---|---|---|---|
| 0 | 1 | 0 | 14 | Type A |
| 1 | 2 | 0 | 14 | Type A |
| 2 | 3 | 0 | 14 | Type A |
| 3 | 4 | 0 | 14 | Type A |
| 4 | 1 | 2 | 12 | Type B |
| 5 | 2 | 2 | 12 | Type B |
| 6 | 3 | 2 | 12 | Type B |
| 7 | 4 | 2 | 12 | Type B |

For example, the table predefined for the ECP downlink fallback DCI may alternatively be at least one row in Table 15 and Table 16, and the table predefined for the ECP uplink fallback DCI may alternatively be at least one row in Table 17.

TABLE 15

Example of a time-domain resource indication table for ECP downlink fallback DCI

| Index | K0 | Start | Length | PDSCH mapping type |
|---|---|---|---|---|
| 0 | 0 | 2 | 10 | Type A |
| 1 | 0 | 2 | 8 | Type A |
| 2 | 0 | 2 | 7 | Type A |
| 3 | 0 | 2 | 6 | Type A |
| 4 | 0 | 3 | 9 | Type A |
| 5 | 0 | 3 | 7 | Type A |
| 6 | 0 | 3 | 6 | Type A |
| 7 | 0 | 3 | 5 | Type A |

TABLE 16

Example of a time-domain resource indication table for ECP downlink fallback DCI

| Index | K0 | Start | Length | PDSCH mapping type |
|---|---|---|---|---|
| 0 | 0 | 2 | 10 | Type A |
| 1 | 0 | 2 | 9 | Type A |
| 2 | 0 | 2 | 8 | Type A |
| 3 | 0 | 2 | 7 | Type A |
| 4 | 0 | 3 | 9 | Type A |
| 5 | 0 | 3 | 8 | Type A |
| 6 | 0 | 3 | 7 | Type A |
| 7 | 0 | 3 | 6 | Type A |

TABLE 17

Example of a time-domain resource
indication table for ECP uplink fallback DCI

| Index | K2 | Start | Length | PUSCH mapping type |
|---|---|---|---|---|
| 0 | 1 | 0 | 12 | Type A |
| 1 | 2 | 0 | 12 | Type A |
| 2 | 3 | 0 | 12 | Type A |
| 3 | 4 | 0 | 12 | Type A |
| 4 | 1 | 2 | 10 | Type B |
| 5 | 2 | 2 | 10 | Type B |
| 6 | 3 | 2 | 10 | Type B |
| 7 | 4 | 2 | 6 | Type B |

For a time-domain resource allocation table configured by using the RRC, the NCP and the ECP may correspond to a same SLIV formula or different SLIV formulas, so that one NCP time-domain resource allocation table and one ECP time-domain resource allocation table can be configured for the terminal device. Different CP types correspond to different sets of SLIV values determined based on the quantity of start symbols of the scheduled data and the length of the scheduled data. The terminal device determines the time-domain resource allocation table based on the CP type, or configures a time-domain resource allocation table shared by the NCP and the ECP.

In one embodiment, if the NCP and the ECP use a same SLIV formula, the formula may be as follows:

if $(L-1) \leq 7$ then $SLIV = 14 \cdot (L-1) + S$ else $SLIV = 14 \cdot (14-L+1) + (14-1-S)$ where $0 < L \leq 14-S$ Herein, S indicates a start symbol start, and L indicates a quantity length of symbols.

If the NCP and the ECP use different SLIV formulas, a formula used by the NCP may be as follows:

if $(L-1) \leq 7$ then $SLIV = 14 \cdot (L-1) + S$ else $SLIV = 14 \cdot (14-L+1) + (14-1-S)$ where $0 < L \leq 14-S$ A formula used by the ECP may be as follows:

if $(L-1) \leq 6$ then $SLIV = 12 \cdot (L-1) + S$ else $SLIV = 12 \cdot (12-L+1) + (12-1-S)$ where $0 < L \leq 12-S$ Herein, S indicates a start symbol start, and L indicates a quantity length of symbols.

In one embodiment, for a time-domain resource allocation table configured by using the RRC, for time-domain resource allocation of a physical uplink data shared channel PUSCH and time-domain resource allocation of a physical downlink data shared channel PDSCH, indexes of start symbols and lengths of the scheduled data have different value ranges. Therefore, quantities of bits used to indicate SLIV values may be different. For example, an SLIV value in a time-domain resource allocation table for the physical downlink shared channel is represented by using 6 bits, and an SLIV value in a time-domain resource allocation table for the uplink shared channel is represented by using 7 bits. However, a maximum SLIV value generated by using the SLIV formula is greater than 63, that is, six bits cannot be directly used to represent the SLIV value. Considering that a possible quantity of SLIVs is less than or equal to 64, to reduce overheads, 6 bits or fewer bits may be used to indicate time-domain resource allocation. In embodiments of the invention, a rule of mapping between parameters an index and an SLIV value is defined. In the time-domain resource allocation table configured by using the RRC, this parameter is used to indicate the SLIV value.

In one embodiment, the NCP and the ECP may correspond to different rules of mapping between parameters an index and an SLIV value. In one embodiment, the rule of mapping between parameters an index and an SLIV may be determined by using a table.

The mapping between parameters an index and an SLIV value may be separately defined for the NCP and the ECP, or may be a predefined mapping rule shared by the NCP and the ECP.

For example, for a PDSCH mapping rule A, the NCP and the ECP use a same SLIV formula, and use a same time-domain resource configuration table or different time-domain resource configuration tables. Using a same table means that only one table is configured by using higher layer signaling. Using different time-domain resource configuration tables means that one table is configured for each of the NCP and the ECP by using higher layer signaling, and a same rule of mapping between parameters an index and an SLIV value is used, for example, at least one row shown in Table 27.

For a PDSCH mapping rule B, the NCP and the ECP use a same SLIV formula, use a same time-domain resource configuration table or different time-domain resource configuration tables, and use a same mapping rule, for example, at least one row shown in Table 20, or use different mapping rules, for example, at least one row shown in Table 18 and Table 19.

For a PUSCH mapping rule A, the NCP and the ECP use a same SLIV formula, use a same time-domain resource configuration table or different time-domain resource configuration tables, and use a same rule of mapping between parameters an index and an SLIV value, for example, at least one row shown in Table 32.

For a PUSCH mapping rule B, the NCP and the ECP use a same SLIV formula, use a same time-domain resource configuration table or different time-domain resource configuration tables, and use a same mapping rule, for example, at least one row shown in Table 33.

TABLE 18

Mapping between an index and an
SLIV in an NCP PDSCH mapping rule B

| Index | SLIV | Start | Length |
|---|---|---|---|
| 0-12 | 14-26 | 0-12 | 2 |
| 13-23 | 42-52 | 0-10 | 4 |
| 24-31 | 84-91 | 0-7 | 7 |

TABLE 19

Mapping between an index and an SLIV in an ECP PDSCH mapping rule B

| Index | SLIV  | Start | Length |
|-------|-------|-------|--------|
| 0-10  | 14-24 | 0-10  | 2      |
| 11-19 | 42-50 | 0-8   | 4      |
| 20-26 | 70-76 | 0-6   | 6      |

TABLE 20

Mapping between an index and an SLIV in an ECP and NCP PDSCH mapping rule B

| Index | SLIV  | Start | Length |
|-------|-------|-------|--------|
| 0-12  | 14-26 | 0-12  | 2      |
| 13-23 | 42-52 | 0-10  | 4      |
| 24-30 | 70-76 | 0-6   | 6      |
| 31-38 | 84-91 | 0-7   | 7      |

In one embodiment, when the NCP and the ECP use a same SLIV formula, a table that is of mapping between parameters an index and an SLIV and that is shared by the NCP and the ECP may be at least one row in at least one of the following mapping manners in the following tables:

The following uses a downlink 6-bit indication and an uplink 7-bit indication as an example. A table corresponding to another quantity of bits may be deduced similarly. In one embodiment, this is not limited herein.

TABLE 21-1

Mapping between an index and an SLIV for NCP and ECP PDSCHs

| PDSCH mapping type A | | PDSCH mapping type B | |
|---|---|---|---|
| Index | SLIV | Index | SLIV |
| 0-3   | 0-3   | 0-12  | 14-26 |
| 4-7   | 14-7  | 13-23 | 42-52 |
| 8-11  | 28-31 | 24-30 | 70-76 |
| 12-15 | 42-45 | 31-38 | 84-91 |
| 16-19 | 56-59 | 39-63 | Reserved (Reserved) |
| 20-23 | 70-73 | | |
| 24-27 | 84-87 | | |
| 28-31 | 98-101| | |
| 32-35 | 92-95 | | |
| 36-39 | 79-82 | | |
| 40-43 | 66-69 | | |
| 44-46 | 53-55 | | |
| 47-48 | 40-41 | | |
| 49    | 27    | | |
| 50-63 | Reserved | | |

The reserved bit may be used to indicate another possible SLIV value, or may be used to indicate other information.

TABLE 21-2

Mapping between an index and an SLIV for NCP and ECP PDSCHs

| PDSCH mapping type A | | PDSCH mapping type B | |
|---|---|---|---|
| Index | SLIV | Index | SLIV |
| 0-3   | 28-31 | 0-12  | 14-26 |
| 4-7   | 42-45 | 13-23 | 42-52 |
| 8-11  | 56-59 | 24-30 | 70-76 |
| 12-15 | 70-73 | 31-38 | 84-91 |
| 16-19 | 84-87 | 39-63 | Reserved |
| 20-23 | 98-101| | |

TABLE 21-2-continued

Mapping between an index and an SLIV for NCP and ECP PDSCHs

| PDSCH mapping type A | | PDSCH mapping type B | |
|---|---|---|---|
| Index | SLIV | Index | SLIV |
| 24-27 | 94-97 | | |
| 28-31 | 80-83 | | |
| 32-35 | 66-69 | | |
| 36-38 | 53-55 | | |
| 39-40 | 40-41 | | |
| 41    | 27    | | |
| 42-63 | Reserved | | |

TABLE 22-1

Mapping between an index and an SLIV for NCP and ECP PUSCHs

| PUSCH mapping type A | | PUSCH mapping type B | |
|---|---|---|---|
| Index | SLIV | Index | SLIV |
| 0  | 0    | 0-13    | 0-13    |
| 1  | 14   | 14-26   | 14-26   |
| 2  | 28   | 28-39   | 28-39   |
| 3  | 42   | 42-52   | 42-52   |
| 4  | 56   | 56-65   | 56-65   |
| 5  | 70   | 70-78   | 70-78   |
| 6  | 84   | 84-91   | 84-91   |
| 7  | 98   | 98-104  | 98-104  |
| 8  | 92   | 92-97   | 92-97   |
| 9  | 79   | 79-83   | 79-83   |
| 10 | 66   | 66-69   | 66-69   |
| 11 | 53   | 53-55   | 53-55   |
| 12 | 40   | 40-41   | 40-41   |
| 13 | 27   | 27      | 27      |
| 14-127 | Reserved | 105-127 | Reserved |

TABLE 22-2

Mapping between an index and an SLIV for NCP and ECP PUSCHs

| PUSCH mapping type A | | PUSCH mapping type B | |
|---|---|---|---|
| Index | SLIV | Index | SLIV |
| 0  | 42 | 0-13 | 0-13 |
| 1  | 56 | 14-26 | 14-26 |
| 2  | 70 | 28-39 | 28-39 |
| 3  | 84 | 42-52 | 42-52 |
| 4  | 98 | 56-65 | 56-65 |
| 5  | 92 | 70-78 | 70-78 |
| 6  | 79 | 84-91 | 84-91 |
| 7  | 66 | 98-104 | 98-104 |
| 8  | 53 | 92-97 or 97-92 | 97-92 |
| 9  | 40 | 79-83 or 83-79 | 83-79 |
| 10 | 27 | 66-69 or 69-66 | 69-66 |
| 11/127 | Reserved | 53-55 or 55-53 | 55-53 |
| | | 40-41 or 41-40 | 41-40 |
| | | 27 | 27 |
| | | 105-127 | Reserved |

In one embodiment, when the NCP and the ECP use a same SLIV formula, a table that is of mapping between parameters an index and an SLIV and that corresponds to the NCP and a table that is of mapping between parameters an index and an SLIV and that corresponds to the ECP each may be at least one row in at least one of the following mapping manners in the following tables:

TABLE 23-1

Mapping between an index and an SLIV for an NCP PDSCH

| PDSCH mapping type A | | PDSCH mapping type B | |
| --- | --- | --- | --- |
| Index | SLIV | Index | SLIV |
| 0-3 | 0-3 | 0-12 | 14-26 |
| 4-7 | 14-17 | 13-23 | 42-52 |
| 8-11 | 28-31 | 24-31 | 84-91 |
| 12-15 | 42-45 | 32-63 | Reserved |
| 16-19 | 56-59 | | |
| 20-23 | 70-73 | | |
| 24-27 | 84-87 | | |
| 28-31 | 98-101 | | |
| 32-35 | 92-95 | | |
| 36-39 | 79-82 | | |
| 40-43 | 66-69 | | |
| 44-46 | 53-55 | | |
| 47-48 | 40-41 | | |
| 49 | 27 | | |
| 50/63 | Reserved | | |

TABLE 23-2

Mapping between an index and an SLIV for an NCP PDSCH

| PDSCH mapping type A | | PDSCH mapping type B | |
| --- | --- | --- | --- |
| Index | SLIV | Index | SLIV |
| 0-3 | 28-31 | 0-12 | 14-26 |
| 4-7 | 42-45 | 13-23 | 42-52 |
| 8-11 | 56-59 | 24-31 | 84-91 |
| 12-15 | 70-73 | 32-63 | Reserved |
| 16-19 | 84-87 | | |
| 20-23 | 98-101 | | |
| 24-27 | 94-97 | | |
| 28-31 | 80-83 | | |
| 32-35 | 66-69 | | |
| 36-38 | 53-55 | | |
| 39-40 | 40-41 | | |
| 41 | 27 | | |
| 42-63 | Reserved | | |

TABLE 24-1

Mapping between an index and an SLIV for an ECP PDSCH

| PDSCH mapping type A | | PDSCH mapping type B | |
| --- | --- | --- | --- |
| Index | SLIV | Index | SLIV |
| 0-3 | 0-3 | 0-10 | 14-24 |
| 4-7 | 14-17 | 11-19 | 42-50 |
| 8-11 | 28-31 | 20-26 | 70-76 |
| 12-15 | 42-45 | 27-63 | Reserved |
| 16-19 | 56-59 | | |
| 20-23 | 70-73 | | |
| 24-27 | 84-87 | | |
| 28-31 | 98-101 | | |
| 32-35 | 92-95 | | |
| 36-39 | 79-82 | | |
| 40-43 | 66-69 | | |
| 44-46 | 53-55 | | |
| 47-63 | Reserved | | |

TABLE 24-2

Mapping between an index and an SLIV for an ECP PDSCH

| PDSCH mapping type A | | PDSCH mapping type B | |
| --- | --- | --- | --- |
| Index | SLIV | Index | SLIV |
| 0-3 | 28-31 | 0-10 | 14-24 |
| 4-7 | 42-45 | 11-19 | 42-50 |
| 8-11 | 56-59 | 20-26 | 70-76 |
| 12-15 | 70-73 | 27-63 | Reserved |
| 16-19 | 84-87 | | |
| 20-23 | 98-101 | | |
| 24-27 | 94-97 | | |
| 28-30 | 81-83 | | |
| 31-32 | 68-69 | | |
| 33 | 55 | | |
| 34-63 | Reserved | | |

TABLE 25-1

Mapping between an index and an SLIV for an NCP PUSCH

| PUSCH mapping type A | | PUSCH mapping type B | |
| --- | --- | --- | --- |
| Index | SLIV | Index | SLIV |
| 0 | 0 | 0-13 | 0/13 |
| 1 | 14 | 14-26 | 14-26 |
| 2 | 28 | 28-39 | 28-39 |
| 3 | 42 | 42-52 | 42-52 |
| 4 | 56 | 56-65 | 56-65 |
| 5 | 70 | 70-78 | 70-78 |
| 6 | 84 | 84-91 | 84-91 |
| 7 | 98 | 98-104 | 98-104 |
| 8 | 92 | 92-97 | 92-97 |
| 9 | 79 | 79-83 | 79-83 |
| 10 | 66 | 66-69 | 66-69 |
| 11 | 53 | 53-55 | 53-55 |
| 12 | 40 | 40-41 | 40-41 |
| 13 | 27 | 27 | 27 |
| 14/127 | Reserved | 105-127 | Reserved |

TABLE 25-2

Mapping between an index and an SLIV for an NCP PUSCH

| PUSCH mapping type A | | PUSCH mapping type B | |
| --- | --- | --- | --- |
| Index | SLIV | Index | SLIV |
| 0 | 42 | 0-13 | 0-13 |
| 1 | 56 | 14-26 | 14-26 |
| 2 | 70 | 28-39 | 28-39 |
| 3 | 84 | 42-52 | 42-52 |
| 4 | 98 | 56-65 | 56-65 |
| 5 | 92 | 70-78 | 70-78 |
| 6 | 79 | 84-91 | 84/91 |
| 7 | 66 | 98-104 | 98-104 |
| 8 | 53 | 92-97 or 97-92 | 92-97 |
| 9 | 40 | 79-83 or 83-79 | 79-83 |
| 10 | 27 | 66-69 or 69-66 | 66-69 |
| 11/127 | Reserved | 53-55 or 55-53 | 53-55 |
| | | 40-41 or 41-40 | 40-41 |
| | | 27 | 27 |
| | | 105-127 | Reserved |

TABLE 26-1

Mapping between an index and an SLIV for an ECP PUSCH

| PUSCH mapping type A | | PUSCH mapping type B | |
|---|---|---|---|
| Index | SLIV | Index | SLIV |
| 0 | 0 | 0-11 | 0-11 |
| 1 | 14 | 12-22 | 14-24 |
| 2 | 28 | 23-31 | 28-37 |
| 3 | 42 | 32-40 | 42-50 |
| 4 | 56 | 41-48 | 56-63 |
| 5 | 70 | 49-55 | 70-76 |
| 6 | 84 | 56-61 | 84-89 |
| 7 | 98 | 62-66 | 98-102 |
| 8 | 92 | 67-70 | 92-95 |
| 9 | 79 | 71-73 | 79-81 |
| 10 | 66 | 74-75 | 66-67 |
| 11 | 53 | 76 | 53 |
| 12-127 | Reserved | 77-127 | Reserved |

TABLE 26-2

Mapping between an index and an SLIV for an ECP PUSCH

| PUSCH mapping type A | | PUSCH mapping type B | |
|---|---|---|---|
| Index | SLIV | Index | SLIV |
| 0 | 42 | 0-11 | 0/11 |
| 1 | 56 | 12-22 | 14-24 |
| 2 | 70 | 23-31 | 28-37 |
| 3 | 84 | 32-40 | 42-50 |
| 4 | 98 | 41-48 | 56-63 |
| 5 | 92 | 49-55 | 70-76 |
| 6 | 79 | 56-61 | 84-89 |
| 7 | 66 | 62-66 | 98-102 |
| 8 | 53 | 67-70 or 70-67 | 94-97 |
| 9-127 | Reserved | 71-73 or 73-71 | 81-83 |
| | | 74-75 or 75-74 | 68-69 |
| | | 76 | 55 |
| | | 77-127 | Reserved |

For example, for a PDSCH mapping type A, the NCP and the ECP use different SLIV formulas, use a same time-domain resource configuration table or different time-domain resource configuration tables, and use different rules of mapping between parameters an index and an SLIV value, for example, at least one row shown in Table 27 and Table 29.

For a PDSCH mapping type B, the NCP and the ECP use different SLIV formulas, use a same time-domain resource configuration table or different time-domain resource configuration tables, and use different rules of mapping between parameters an index and an SLIV value, for example, at least one row shown in Table 28 and Table 30.

For a PUSCH mapping type A, the NCP and the ECP use different SLIV formulas, use a same time-domain resource configuration table or different time-domain resource configuration tables, and use different rules of mapping between parameters an index and an SLIV value, for example, at least one row shown in Table 31 and Table 33.

For a PUSCH mapping type B, the NCP and the ECP use different SLIV formulas, use a same time-domain resource configuration table or different time-domain resource configuration tables, and use different rules of mapping between parameters an index and an SLIV, for example, at least one row shown in Table 32 and Table 34. In one embodiment, the terminal device may determine different relationships of mapping between an index and an SLIV based on different mapping types. The different mapping types may be at least one of the PDSCH mapping rule A, the PDSCH mapping rule B, the PUSCH mapping rule A, and the PUSCH mapping rule B.

TABLE 27-1

Mapping between an index and an SLIV in an NCP PDSCH mapping rule A

| Index | SLIV | Length | Start |
|---|---|---|---|
| 0-3 | 0-3 | 1 | 0-3 |
| 4-7 | 14-17 | 2 | 0-3 |
| 8-11 | 28-31 | 3 | 0-3 |
| 12-15 | 42-45 | 4 | 0-3 |
| 16-19 | 56-59 | 5 | 0-3 |
| 20-23 | 70-73 | 6 | 0-3 |
| 24-27 | 84-87 | 7 | 0-3 |
| 28-31 | 98-101 | 8 | 0-3 |
| 32-35 | 92-95 | 9 | 0-3 |
| 36-39 | 79-82 | 10 | 0-3 |
| 40-43 | 66-69 | 11 | 0-3 |
| 44-46 | 53-55 | 12 | 0-2 |
| 47-48 | 40-41 | 13 | 0-1 |
| 49 | 27 | 14 | 0 |

TABLE 27-2

Mapping between an index and an SLIV in an NCP PDSCH mapping rule A

| Index | SLIV | Length | Start |
|---|---|---|---|
| 0-3 | 28-31 | 3 | 0-3 |
| 4-7 | 42-45 | 4 | 0-3 |
| 8-11 | 56-59 | 5 | 0-3 |
| 12-15 | 70-73 | 6 | 0-3 |
| 16-19 | 84-87 | 7 | 0-3 |
| 20-23 | 98-101 | 8 | 0-3 |
| 24-27 or 27-24 | 97-94 | 9 | 0-3 |
| 28-31 or 31-28 | 83-80 | 10 | 0-3 |
| 32-35 or 35-32 | 69-66 | 11 | 0-3 |
| 36-38 or 38-36 | 55-53 | 12 | 0-2 |
| 39-40 or 40-39 | 41-40 | 13 | 0-1 |
| 41 | 27 | 14 | 0 |

TABLE 28

Mapping between an index and an SLIV in an NCP PDSCH mapping rule B

| Index | SLIV | Start | Length |
|---|---|---|---|
| 0-12 | 14-26 | 0-12 | 2 |
| 13-23 | 42-52 | 0-10 | 4 |
| 24-31 | 84-91 | 0-7 | 7 |

TABLE 29-1

Mapping between an index and an SLIV in an ECP PDSCH mapping rule A

| Index | SLIV | Length | Start |
|---|---|---|---|
| 0-3 | 0-3 | 1 | 0-3 |
| 4-7 | 12-15 | 2 | 0-3 |
| 8-11 | 24-27 | 3 | 0-3 |
| 12-15 | 36-39 | 4 | 0-3 |
| 16-19 | 48-51 | 5 | 0-3 |
| 20-23 | 60-63 | 6 | 0-3 |
| 24-27 | 72-75 | 7 | 0-3 |
| 28-31 | 68-71 | 8 | 0-3 |
| 32-35 | 56-59 | 9 | 0-3 |
| 36-38 | 45-47 | 10 | 0-2 |

TABLE 29-1-continued

Mapping between an index and an SLIV in an ECP PDSCH mapping rule A

| Index | SLIV | Length | Start |
|---|---|---|---|
| 39-40 | 34-35 | 11 | 0-1 |
| 41 | 23 | 12 | 0 |

TABLE 29-2

Mapping between an index and an SLIV in an ECP PDSCH mapping rule A

| Index | SLIV | Length | Start |
|---|---|---|---|
| 0-3 | 24-27 | 3 | 0-3 |
| 4-7 | 36-39 | 4 | 0-3 |
| 8-11 | 48-51 | 5 | 0-3 |
| 12-15 | 60-63 | 6 | 0-3 |
| 16-19 | 72-75 | 7 | 0-3 |
| 20-23 or 23-20 | 71-68 | 8 | 0-3 |
| 24-27 or 27-24 | 59-56 | 9 | 0-3 |
| 28-30 or 30-28 | 47-45 | 10 | 0-2 |
| 31-32 or 32-31 | 35-34 | 11 | 0-1 |
| 33 | 23 | 12 | 0 |

TABLE 30

Mapping between an index and an SLIV in an ECP PDSCH mapping rule B

| Index | SLIV | Start | Length |
|---|---|---|---|
| 0-10 | 12-22 | 0-10 | 2 |
| 11-19 | 36-44 | 0-8 | 4 |
| 20-26 | 60-66 | 0-6 | 6 |

TABLE 31

Mapping between an index and an SLIV in an NCP PUSCH mapping rule A

| Index | SLIV | Length | Start |
|---|---|---|---|
| 0 | 0 | 1 | 0 |
| 1 | 14 | 2 | 0 |
| 2 | 28 | 3 | 0 |
| 3 | 42 | 4 | 0 |
| 4 | 56 | 5 | 0 |
| 5 | 70 | 6 | 0 |
| 6 | 84 | 7 | 0 |
| 7 | 98 | 8 | 0 |
| 8 | 92 | 9 | 0 |
| 9 | 79 | 10 | 0 |
| 10 | 66 | 11 | 0 |
| 11 | 53 | 12 | 0 |
| 12 | 40 | 13 | 0 |
| 13 | 27 | 14 | 0 |
| 0 | 42 | 4 | 0 |
| 1 | 56 | 5 | 0 |
| 2 | 70 | 6 | 0 |
| 3 | 84 | 7 | 0 |
| 4 | 98 | 8 | 0 |
| 5 | 92 | 9 | 0 |
| 6 | 79 | 10 | 0 |
| 7 | 66 | 11 | 0 |
| 8 | 53 | 12 | 0 |
| 9 | 40 | 13 | 0 |
| 10 | 27 | 14 | 0 |

TABLE 32-1

Mapping between an index and an SLIV in an NCP PUSCH mapping rule B

| Index | SLIV | Length | Start |
|---|---|---|---|
| 0-13 | 0-13 | 1 | 0-13 |
| 14-26 | 14-26 | 2 | 0-12 |
| 28-39 | 28-39 | 3 | 0-11 |
| 42-52 | 42-52 | 4 | 0-10 |
| 56-65 | 56-65 | 5 | 0-9 |
| 70-78 | 70-78 | 6 | 0-8 |
| 84-91 | 84-91 | 7 | 0-7 |
| 98-104 | 98-104 | 8 | 0-6 |
| 92-97 | 92-97 | 9 | 0-5 |
| 79-83 | 79-83 | 10 | 0-4 |
| 66-69 | 66-69 | 11 | 0-3 |
| 53-55 | 53-55 | 12 | 0-2 |
| 40-41 | 40-41 | 13 | 0-1 |
| 27 | 27 | 14 | 0 |

TABLE 32-2

Mapping between an index and an SLIV in an NCP PUSCH mapping rule B

| Index | SLIV | Length | Start |
|---|---|---|---|
| 0-13 | 0-13 | 1 | 0-13 |
| 14-26 | 14-26 | 2 | 0-12 |
| 28-39 | 28-39 | 3 | 0-11 |
| 42-52 | 42-52 | 4 | 0-10 |
| 56-65 | 56-65 | 5 | 0-9 |
| 70-78 | 70-78 | 6 | 0-8 |
| 84-91 | 84-91 | 7 | 0-7 |
| 98-104 | 98-104 | 8 | 0-6 |
| 97-92 or 92-97 | 97-92 | 9 | 0-5 |
| 83-79 or 79-83 | 83-79 | 10 | 0-4 |
| 69-66 or 66-69 | 69-66 | 11 | 0-3 |
| 55-53 or 53-55 | 55-53 | 12 | 0-2 |
| 41-40 or 40-41 | 41-40 | 13 | 0-1 |
| 27 | 27 | 14 | 0 |

TABLE 33-1

Mapping between an index and an SLIV in an ECP PUSCH mapping rule A

| Index | SLIV | Length | Start |
|---|---|---|---|
| 0 | 0 | 1 | 0 |
| 1 | 12 | 2 | 0 |
| 2 | 24 | 3 | 0 |
| 3 | 36 | 4 | 0 |
| 4 | 48 | 5 | 0 |
| 5 | 60 | 6 | 0 |
| 6 | 72 | 7 | 0 |
| 7 | 71 | 8 | 0 |
| 8 | 59 | 9 | 0 |
| 9 | 47 | 10 | 0 |
| 10 | 35 | 11 | 0 |
| 11 | 23 | 12 | 0 |

TABLE 33-2

Mapping between an index and an SLIV in an ECP PUSCH mapping rule A

| Index | SLIV | Length | Start |
|---|---|---|---|
| 0 | 36 | 4 | 0 |
| 1 | 48 | 5 | 0 |
| 2 | 60 | 6 | 0 |
| 3 | 72 | 7 | 0 |

TABLE 33-2-continued

Mapping between an index and an SLIV in an ECP PUSCH mapping rule A

| Index | SLIV | Length | Start |
|---|---|---|---|
| 4 | 71 | 8 | 0 |
| 5 | 59 | 9 | 0 |
| 6 | 47 | 10 | 0 |
| 7 | 35 | 11 | 0 |
| 8 | 23 | 12 | 0 |

TABLE 34-1

Mapping between an index and an SLIV in an ECP PUSCH mapping rule B

| Index | SLIV | Length | Start |
|---|---|---|---|
| 0-13 | 0-11 | 1 | 0-11 |
| 14-26 | 12-22 | 2 | 0-10 |
| 28-39 | 24-33 | 3 | 0-9 |
| 42-52 | 36-44 | 4 | 0-8 |
| 56-65 | 48-55 | 5 | 0-7 |
| 70-78 | 60-66 | 6 | 0-6 |
| 84-91 | 72-77 | 7 | 0-5 |
| 98-104 | 67-71 | 8 | 0-4 |
| 92-97 | 56-59 | 9 | 0-3 |
| 79-83 | 45-47 | 10 | 0-2 |
| 66-69 | 34-35 | 11 | 0-1 |
| 53-55 | 23 | 12 | 0 |

TABLE 34-2

Mapping between an index and an SLIV in an ECP PUSCH mapping rule B

| Index | SLIV | Length | Start |
|---|---|---|---|
| 0-11 | 0-11 | 1 | 0-11 |
| 12-22 | 12-22 | 2 | 0-10 |
| 24-33 | 24-33 | 3 | 0-9 |
| 36-44 | 36-44 | 4 | 0-8 |
| 48-55 | 48-55 | 5 | 0-7 |
| 60-66 | 60-66 | 6 | 0-6 |
| 72-77 | 72-77 | 7 | 0-5 |
| 71-67 or 67-71 | 71-67 | 8 | 0-4 |
| 59-56 or 56-59 | 59-56 | 9 | 0-3 |
| 47-45 or 45-47 | 47-45 | 10 | 0-2 |
| 35-34 or 34-35 | 35-34 | 11 | 0-1 |
| 23 | 23 | 12 | 0 |

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, refer to relevant description of another embodiment. The embodiments of this application and features disclosed in the accompanying drawings may exist independently, or exist in a combination. Features described in a hardware form in the embodiments of this application may be executed by software, and vice versa. This is not limited herein.

A person of ordinary skill in the art may be aware that, in combination with the examples described in the embodiments disclosed in this specification, methods and operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be various non-transitory machine-readable media that can store program code, such as a magnetic medium (for example, a floppy disk, a hard disk, or a magnetic tape), an optical medium (for example, a compact disc), and a semiconductor medium (for example, a solid-state drive (SSD)).

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, refer to relevant description of another embodiment. The embodiments of this application, claims, and features disclosed in the accompanying drawings may exist independently, or exist in a combination. Features described in a hardware form in the embodiments of this application may be executed by software, and vice versa. This is not limited herein.

What is claimed is:

1. A communications method comprising:
   obtaining first indication information and format information; and
   determining, based on a transmission direction that is of a sub-time unit in a time unit and that is indicated by the first indication information and a transmission direction that is of the sub-time unit and that is indicated by the format information, whether the time unit is an aggregation time unit.

2. The method according to claim 1, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:
   when a transmission direction that is of at least one sub-time unit in the time unit and that is indicated by the first indication information is same as the transmission direction that is of the at least one sub-time unit and that is indicated by the format information, determining that the time unit is the aggregation time unit.

3. The method according to claim 1, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:
when a proportion of a first sub-time unit to at least one sub-time unit in the time unit reaches M, determining that the time unit is the aggregation time unit, wherein a transmission direction that is of the first sub-time unit and that is indicated by the first indication information is same as a transmission direction that is of the first sub-time unit and that is indicated by the format information, and a value of M falls within a range of [0, 1].

4. The method according to claim 1, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:
when a quantity of second sub-time units in the time unit is less than P, determining that the time unit is the aggregation time unit, wherein a transmission direction that is of the second sub-time unit and that is indicated by the first indication information is different from a transmission direction that is of the second sub-time unit and that is indicated by the format information, and P is a positive integer.

5. The method according to claim 1, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:
when a proportion of a third sub-time unit to at least one sub-time unit in the time unit is less than Q, determining that the time unit is the aggregation time unit, wherein a transmission direction that is of the third sub-time unit and that is indicated by the first indication information is different from a transmission direction that is of the third sub-time unit and that is indicated by the format information, and a value of Q falls within a range of [0, 1].

6. The method according claim 1, wherein the method further comprises:
obtaining second indication information, wherein the second indication information indicates an aggregation quantity; and
determining a quantity of aggregation time units based on the aggregation quantity.

7. A communications apparatus comprising:
a communications interface configured to obtain first indication information and format information; and
a processor configured to determine, based on a transmission direction that is of a sub-time unit in a time unit and that is indicated by the first indication information and a transmission direction that is of the sub-time unit and that is indicated by the format information, whether the time unit is an aggregation time unit.

8. The apparatus according to claim 7, wherein the processor is configured to:
when the transmission direction that is of at least one sub-time unit in the time unit and that is indicated by the first indication information is same as a transmission direction that is of the at least one sub-time unit and that is indicated by the format information, determine that the time unit is the aggregation time unit.

9. The apparatus according to claim 7, wherein the processor is configured to:
when a proportion of a first sub-time unit to at least one sub-time unit in the time unit reaches M, determine that the time unit is the aggregation time unit, wherein a transmission direction that is of the first sub-time unit and that is indicated by the first indication information is same as a transmission direction that is of the first sub-time unit and that is indicated by the format information, and a value of M falls within a range of [0, 1].

10. The apparatus according to claim 7, wherein the processor is configured to:
when a quantity of second sub-time units in the time unit is less than P, determine that the time unit is the aggregation time unit, wherein a transmission direction that is of the second sub-time unit and that is indicated by the first indication information is different from a transmission direction that is of the second sub-time unit and that is indicated by the format information, and P is a positive integer.

11. The apparatus according to claim 7, wherein the processor is configured to:
when a proportion of a third sub-time unit to at least one sub-time unit in the time unit is less than Q, determine that the time unit is the aggregation time unit, wherein a transmission direction that is of the third sub-time unit and that is indicated by the first indication information is different from a transmission direction that is of the third sub-time unit and that is indicated by the format information, and a value of Q falls within a range of [0, 1].

12. The apparatus according to claim 7, wherein the communications interface is further configured to obtain second indication information, wherein the second indication information indicates an aggregation quantity; and
the processor is further configured to determine a quantity of aggregation time units based on the aggregation quantity.

13. A terminal device comprising:
a processor configured to:
obtain first indication information and format information; and
determine, based on a transmission direction that is of a sub-time unit in a time unit and that is indicated by the first indication information and a transmission direction that is of the sub-time unit and that is indicated by the format information, whether the time unit is an aggregation time unit.

14. The terminal device according to claim 13, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:
when a transmission direction that is of at least one sub-time unit in the time unit and that is indicated by the first indication information is same as the transmission direction that is of the at least one sub-time unit and that is indicated by the format information, determining that the time unit is the aggregation time unit.

15. The terminal device according to claim 13, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:

when a proportion of a first sub-time unit to at least one sub-time unit in the time unit reaches M, determining that the time unit is the aggregation time unit, wherein a transmission direction that is of the first sub-time unit and that is indicated by the first indication information is the same as a transmission direction that is of the first sub-time unit and that is indicated by the format information, and a value of M falls within a range of [0, 1].

16. The terminal device according to claim 13, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:

when a quantity of second sub-time units in the time unit is less than P, determining that the time unit is the aggregation time unit, wherein a transmission direction that is of the second sub-time unit and that is indicated by the first indication information is different from a transmission direction that is of the second sub-time unit and that is indicated by the format information, and P is a positive integer.

17. The terminal device according to claim 13, wherein the determining, based on the transmission direction that is of the sub-time unit in the time unit and that is indicated by the first indication information and the transmission direction that is of the sub-time unit and that is indicated by the format information, whether the time unit is the aggregation time unit comprises:

when a proportion of a third sub-time unit to at least one sub-time unit in the time unit is less than Q, determining that the time unit is the aggregation time unit, wherein a transmission direction that is of the third sub-time unit and that is indicated by the first indication information is different from a transmission direction that is of the third sub-time unit and that is indicated by the format information, and a value of Q falls within a range of [0, 1].

* * * * *